United States Patent
Kondo

(10) Patent No.: US 7,155,057 B2
(45) Date of Patent: * Dec. 26, 2006

(54) APPARATUS FOR AND METHOD OF PROCESSING IMAGE AND APPARATUS FOR AND METHOD OF ENCODING IMAGE

(75) Inventor: Tetsujiro Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

This patent is subject to a terminal disclaimer.

(21) Appl. No.: 10/761,534

(22) Filed: Jan. 21, 2004

(65) Prior Publication Data

US 2005/0018916 A1   Jan. 27, 2005

(51) Int. Cl.
*G06K 9/00* (2006.01)
*G06K 9/36* (2006.01)
*H04N 7/12* (2006.01)

(52) U.S. Cl. ..................... 382/166; 382/238
(58) Field of Classification Search .............. 382/162, 382/163, 166, 167, 235, 298–301, 238, 224; 348/414, 414.1, 409.1, 410.1; 358/537
See application file for complete search history.

(56) References Cited

U.S. PATENT DOCUMENTS

| | | |
|---|---|---|
| 4,710,812 A | 12/1987 | Murakami et al. |
| 5,630,036 A | 5/1997 | Sonohara et al. |
| 5,631,979 A | 5/1997 | Cok |
| 5,663,764 A | 9/1997 | Kondo et al. |
| 5,748,235 A | 5/1998 | Kondo et al. |
| 5,903,366 A | 5/1999 | Hirabayashi et al. |

FOREIGN PATENT DOCUMENTS

| | | |
|---|---|---|
| EP | 0632656 A2 | 1/1995 |
| JP | 61-205093 | 9/1986 |
| JP | 63-9390 | 1/1988 |
| JP | 63-269894 | 11/1988 |
| JP | 4-61591 | 2/1992 |
| JP | 7-79453 | 3/1995 |

*Primary Examiner*—Yon J. Couso
(74) *Attorney, Agent, or Firm*—Frommer Lawrence & Haug LLP; William S. Frommer

(57) ABSTRACT

An image of lower spatial resolution is converted into an image of higher spatial resolution efficiently and highly accurately. For such conversion, pixel data is expressed by vectors in a color space of R, G, B, and not only an R component of low resolution but also R, G, B components are used to predict an R component of higher resolution.

2 Claims, 27 Drawing Sheets

NON-EDGE MATCHING

EDGE MATCHING

ADRC PROCESS

APPARATUS FOR AND METHOD OF PROCESSING IMAGE AND APPARATUS FOR AND METHOD OF ENCODING IMAGE

TECHNICAL FIELD

The present invention relates to an apparatus for and a method of processing image data and an apparatus for and a method of encoding image data, and more particularly to an apparatus for and a method of processing image data and an apparatus for and a method of encoding image data for predicting image data efficiently and accurately.

BACKGROUND ART

It has heretofore been customary to convert an image of lower spatial resolution into an image of higher spatial resolution and display the converted image. For conversion of the image, more items of image data are interpolated (generated) from image data of lower spatial resolution.

If image data of lower spatial resolution comprises component signals of R, G, B, for example, then it has been the conventional practice to interpolate the image data independently with respect to the component signals.

Specifically, it has been customary to generate image data of R which is of higher spatial resolution from image data of R which is of lower spatial resolution, image data of G which is of higher spatial resolution from image data of G which is of lower spatial resolution, and image data of B which is of higher spatial resolution from image data of B which is of lower spatial resolution.

As a result, the efficiency has been poor, and a good level of accuracy could not been achieved.

DISCLOSURE OF THE INVENTION

The present invention has been made in view of the above problems, and is intended to improve efficiency and accuracy.

An apparatus for processing an image as recited in claim 1 comprises acquiring means for acquiring first pixel data of a first image, and predicting means for predicting a first component signal of second pixel data of a second image using at least first and second component signals out of component signals of the first pixel data, and predicting a second component signal of the second pixel data of the second image using at least the first and second component signals out of the component signals of the first pixel data.

A method of processing an image as recited in claim 5 comprises the steps of acquiring first pixel data of a first image, and predicting a first component signal of second pixel data of a second image using at least first and second component signals out of component signals of the first pixel data, and predicting a second component signal of the second pixel data of the second image using at least the first and second component signals out of the component signals of the first pixel data.

An apparatus for encoding an image as recited in claim 6 comprises compressing means for compressing a plurality of pixel data expressed by vectors in a color space by making the pixel data fewer, classifying means for classifying the compressed pixel data into a class, memory means for storing predictive data corresponding to the class and including the pixel data expressed by vectors in the color space, and predicting means for predicting an image using the predictive data.

A method of encoding an image as recited in claim 10 comprises the steps of compressing a plurality of pixel data expressed by vectors in a color space by making the pixel data fewer, classifying the compressed pixel data into a class, storing predictive data corresponding to the class and including the pixel data expressed by vectors in the color space, and predicting an image using the predictive data.

According to the apparatus for processing an image as recited in claim 1 and the method of processing an image as recited in claim 5, a component signal of a second image of higher spatial resolution is generated from a plurality of component signals of a first image of lower spatial resolution.

According to the apparatus for encoding an image as recited in claim 6 and the method of encoding an image as recited in claim 10, an image is predicted using predictive data including pixel data expressed by vectors in a color space.

BEST MODE FOR CARRYING OUT THE INVENTION

Figure 1:
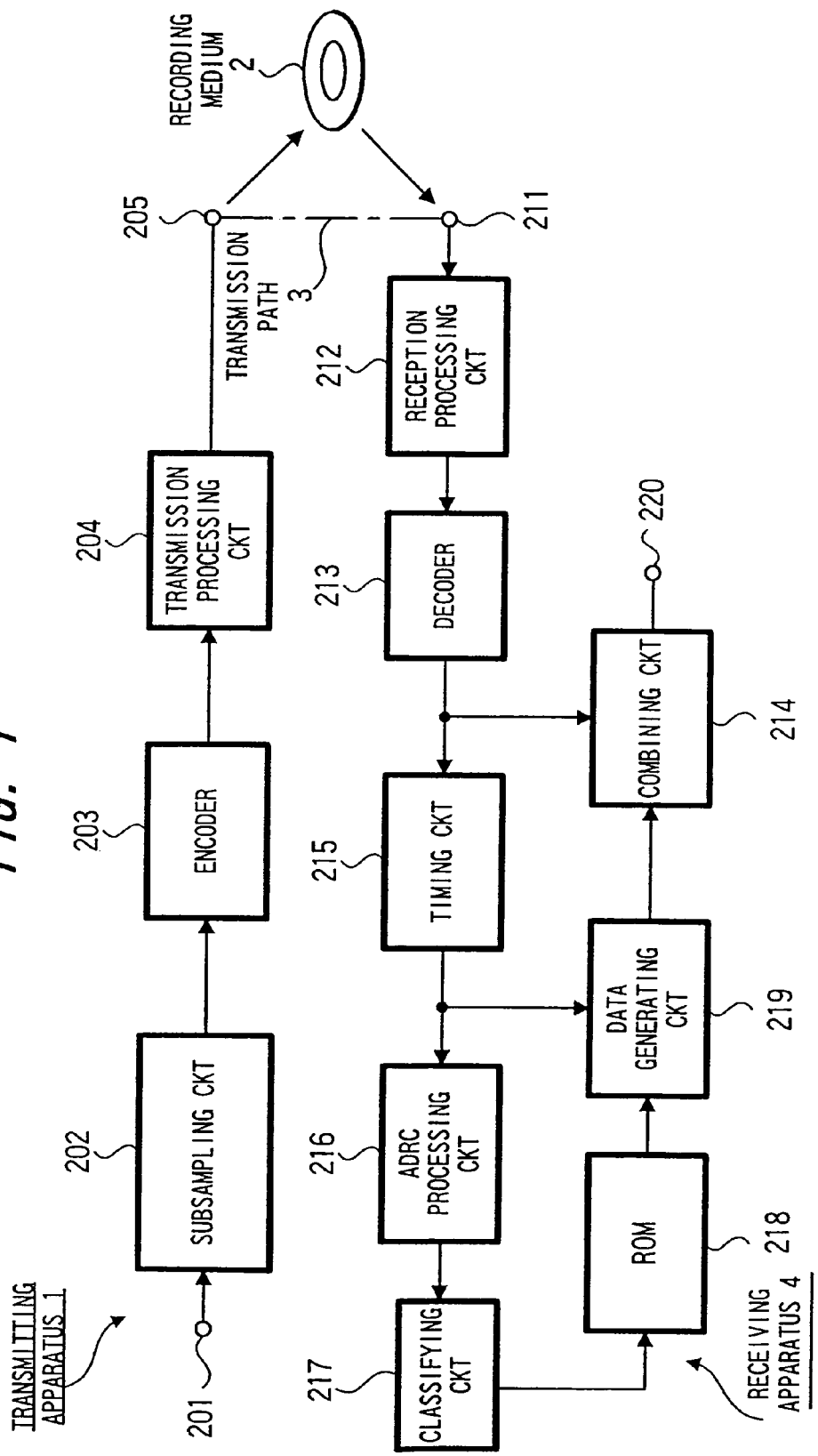
FIG. 1 is a block diagram of a system incorporating an image processing apparatus according to the present invention.

Embodiments of the present invention will be described below. In order to clarify the association between means described in the scope of claims and embodiments to be described below, the means of the present invention will be described together with corresponding embodiments (an example only) added in parentheses after the means, as shown below. However, the described means are not intended to be limited to the specific embodiments.

An image processing apparatus recited in claim 1 comprises acquiring means (e.g., a decoder 13 shown in FIG. 1) for acquiring first pixel data of a first image, and predicting means (e.g., a data generating circuit 219 shown in FIG. 1) for predicting a first component signal of second pixel data of a second image using at least first and second component signals out of component signals of the first pixel data, and predicting a second component signal of the second pixel data of the second image using at least the first and second component signals out of the component signals of the first pixel data.

An image processing apparatus recited in claim 6 comprises compressing means (e.g., a decimating circuit 1 shown in FIG. 8) for compressing a plurality of pixel data expressed by vectors in a color space by making the pixel data fewer, classifying means (e.g., a classifying circuit 45 shown in FIG. 10) for classifying the compressed pixel data into a class, memory means (e.g., a predictive coefficient ROM 81 shown in FIG. 19) for storing predictive data (e.g., predictive coefficients) corresponding to the class and including the pixel data expressed by vectors in the color space, and predicting means (e.g., a predicting circuit 82 shown in FIG. 19) for predicting an image using the predictive data.

FIG. 1 shows a system for decimating image data from a transmitting side and transmitting the image data, and generating decimated pixels and reproducing image data in a receiving side. Digital video data to be transmitted is supplied from an input terminal 201 of a transmitting apparatus 1 to a subsampling circuit 202. Every other pixel data is horizontally decimated from the digital video data, so that the amount of data to be transmitted is reduced to half. An encoder 203 encodes data supplied from the subsampling circuit 202 highly efficiently according to an orthogonal transform coding process such as DCT (Discrete Cosine Transform) or ADRC (Adaptive Dynamic Range Coding), thus further reducing the amount of data to be transmitted. A transmission processing circuit 204 processes output data from the encoder 203 according to error-correction coding, framing, and channel coding, and outputs the processed data from an output terminal 205 to a transmission path 3 or records the processed data on a recording medium 2 such as an optical disk, a magnetic disk, or the like.

Data supplied from the transmission path 3 or the recording medium 2 is sent from an input terminal 211 of a receiving apparatus 4 to a reception processing circuit 212, which decodes the channel-coded data, decodes the framed data, and effects error-correction processing. A decoder 213 decodes the data which has been encoded by the encoder 203 of the transmitting apparatus 1. Decoded data from the decoder 213 is supplied to a timing circuit 215 and a combining circuit 214.

The timing circuit 215 adjusts timing of the decoded data from the decoder 213 so that pixel data to be processed will be generated at the same timing, and outputs the adjusted data to an ADRC processing circuit 216 and a data generating circuit 219. The ADRC processing circuit 216 effects a 1-bit ADRC process on the data supplied from the timing circuit 215, and outputs processed data to a classifying circuit 217. The classifying circuit 217 classify the data supplied from the ADRC processing circuit 216 into a class, and outputs a signal representative of the class as an address to a ROM (Read Only Memory) 218.

The ROM 218 reads coefficient data stored at an address corresponding to the class supplied from the classifying circuit 217, and outputs the coefficient data to the data generating circuit 219. The data generating circuit 219 multiplies the data supplied from the timing circuit 215 by the coefficient data supplied from the ROM 218, generating new pixel data, and outputs the new pixel data to the combining circuit 214. The combining circuit 214 combines the original pixel data supplied from the decoder 213 and the pixel data generated by the data generating circuit 219 with each other, and outputs the combined data from an output terminal 220 to a CRT (not shown), which displays the data.

Figure 2:
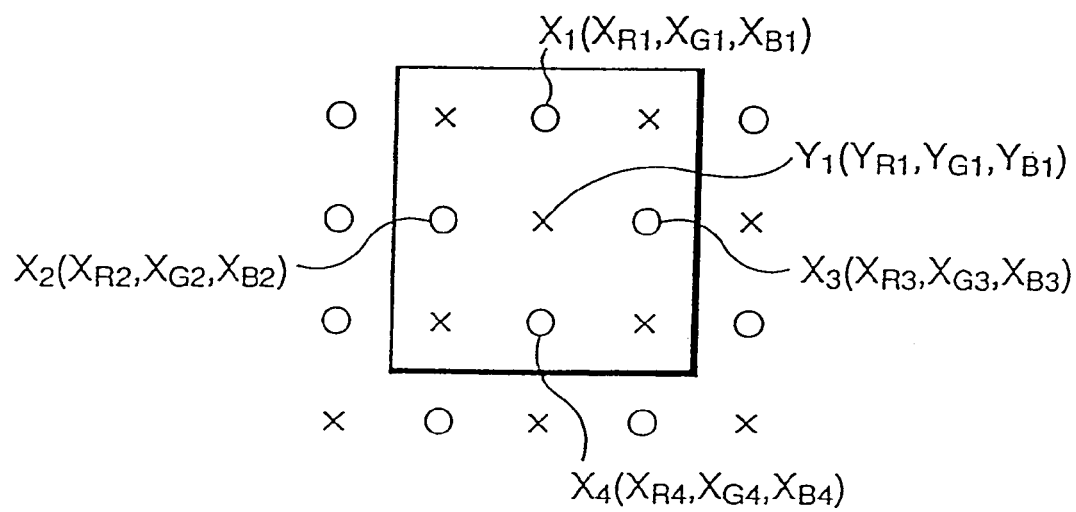
FIG. 2 is a diagram illustrative of operation of a subsampling circuit shown in FIG. 1.

Operation of the system will be described below. Digital image data supplied from the input terminal 201 is decimated horizontally at every other pixel data by the subsampling circuit 202 as shown in FIG. 2. In FIG. 2, ○ represents remaining pixel data, and X represents decimated pixel data which will not be transmitted. The amount of pixel data to be transmitted is thus reduced to half.

The pixel data is then encoded by the encoder 203, after which the encoded data is processed by the transmission processing circuit 204. The processed data is then transmitted from the output terminal 205 to the transmission path 3 or the recording medium 2.

The reception processing circuit 212 receives transmitted data from the transmission path 3 or the recording medium 2 via the input terminal 211, and outputs the received data to the decoder 213. The decoder 213 decodes the supplied data and outputs decoded pixel data (pixel data represented by ○ in FIG. 2) to the combining circuit 214 and the timing circuit 215.

The timing circuit 215 delays the supplied data so that pixel data to be processed will be generated at the same timing. As shown in FIG. 2, pixel data X1 through X4 at respective positions (X1), (X2), (X3), (X4) which are above, left of, right of, and below, respectively, an omitted pixel Y1 are supplied at the same timing to the ADRC processing circuit 216 and the data generating circuit 219.

Figure 3:
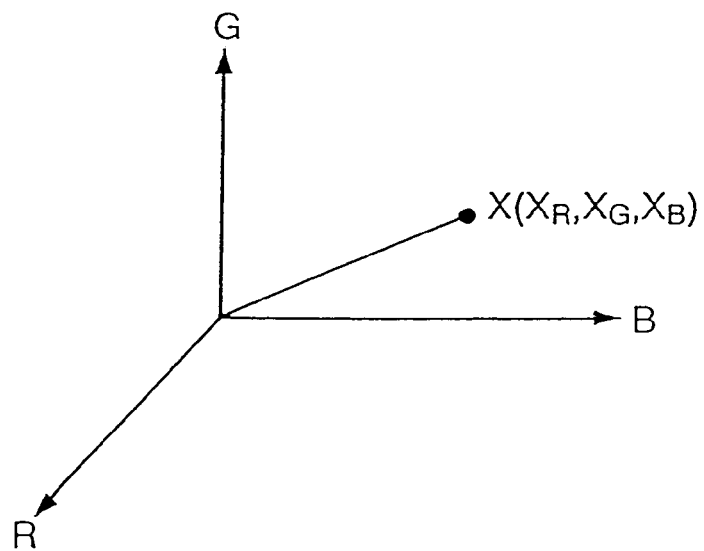
FIG. 3 is a diagram illustrative of pixel data in the embodiment shown in FIG. 1.

The ADRC processing circuit 216 effects an ADRC process on one block which comprises the supplied four pixel data X1 through X4. According to this embodiment, as shown in FIG. 3, each pixel data X comprises vectors (XR, XG, XB) in a color space which are determined by components R, G, B. The vectors XR, XG, XB represents the respective components R, G, B of each data X, and are each expressed by 8 bits. Since the ADRC processing circuit 216 carries out a 1-bit ADRC process, the R component XR1 of the pixel data X1, for example, is expressed by 1 bit, the G component XG1 thereof by 1 bit, and the B component XB1 thereof by 1 bit. Therefore, the pixel data X1 which is originally expressed by 24 bits (3×8) is converted into 3-bit (=3×1) data. The other pixel data X2 through X4 are also converted into 3-bit pixel data. The pixel data (X1, X2, X3, X4) each expressed by 3 bits are supplied to the classifying circuit 217.

The classifying circuit 217 classifies the total of 12-bit (=4×3) data which are supplied into a class, generates a class data signal representing the class, and outputs the class data signal to the ROM 218. In this embodiment, since a class is represented by 12 bits, there are 4096 (=2¹²) classes.

The ROM 218 stores predictive coefficients w for the respective classes. When a signal representative of a certain class is supplied from the classifying circuit 217, the ROM 218 reads a predictive coefficient w stored at an address corresponding to the class, and supplies the read predictive coefficient w to the data generating circuit 219.

The data generating circuit 219 generates pixel data Y1 shown in FIG. 2 using the predictive coefficient w supplied from the ROM 218 and the pixel data X1 through X4 supplied from the timing circuit 215, according to the following equations:

$$YR1 = w1(R)XR1 + w2(R)XG1 + w3(R)XB1 + \\ w4(R)XR2 + w5(R)XG2 + w6(R)XB2 + \\ w7(R)XR3 + w8(R)XG3 + w9(R)XB3 + \\ w10(R)XR4 + w11(R)XG4 + w12(R)XB4$$

$$YG1 = w1(G)XR1 + w2(G)XG1 + w3(G)XB1 + \\ w4(G)XR2 + w5(G)XG2 + w6(G)XB2 + \\ w7(G)XR3 + w8(G)XG3 + w9(G)XB3 + \\ w10(G)XR4 + w11(G)XG4 + w12(G)XB4$$

$$YB1 = w1(B)XR1 + w2(B)XG1 + w3(B)XB1 + \\ w4(B)XR2 + w5(B)XG2 + w6(B)XB2 + \\ w7(B)XR3 + w8(B)XG3 + w9(B)XB3 + \\ w10(B)XR4 + w11(B)XG4 + w12(B)XB4$$

where $wi(R)$, $wi(G)$, $wi(B)$ represent predictive coefficients, respectively, for R, G, B.

It can be seen from the above equations that in this embodiment the R component YR1 of the pixel data Y1 is generated from not only the R components XR1 through XR4 of the surrounding pixels X1 through X4, but also the G components XG1 through XG4 and the B components XB1 through XB4 thereof. Similarly, the G component YG1 and the B component YB1 of the pixel data Y1 are generated not from the corresponding components, but from all the components XR1 through XR4, XG1 through XG4, XB1 through XB4.

An image, particularly a natural image captured by a television camera, exhibits a correlation among pixels such that the closer the pixels, the stronger the correlation among them. Therefore, new pixel data can be calculated efficiently and highly accurately on the basis of closer pixel data.

As indicated by the above equations, the R component YR1 of the pixel data Y1 is determined using the total of 12 data, i.e., XR1 through XB4. In order to use only the 12 R components to calculate the R component YR1, since only one R component is present in each pixel, it is necessary to use the R components of a total of 12 pixels. This process necessarily uses pixel data that are spaced far from the attentional pixel Y1, resulting in low efficiency and accuracy.

According to this embodiment, the R component (also G and B components) of an attentional pixel is generated using the R, G, B components of pixels, so that a necessary number of data can be obtained from closer pixel data, and hence highly accurate pixel data can be generated more efficiently.

The combining circuit 214 combines new pixel data Y generated by the data generating circuit 219 and the original pixel data X supplied from the decoder 213 with each other, and outputs the combined pixel data from the output terminal 220. The pixel data outputted from the output terminal 220 represents an image of higher spatial resolution than an image composed of the pixel data X received by the receiving apparatus 4 (represents an image of the same resolution as the image to be subsampled by the subsampling circuit 202 shown in FIG. 1).

The ROM 218 stores the predictive coefficients w in the above equations. A table of predictive coefficients w may be produced by an apparatus shown in FIG. 4.

Figure 4:
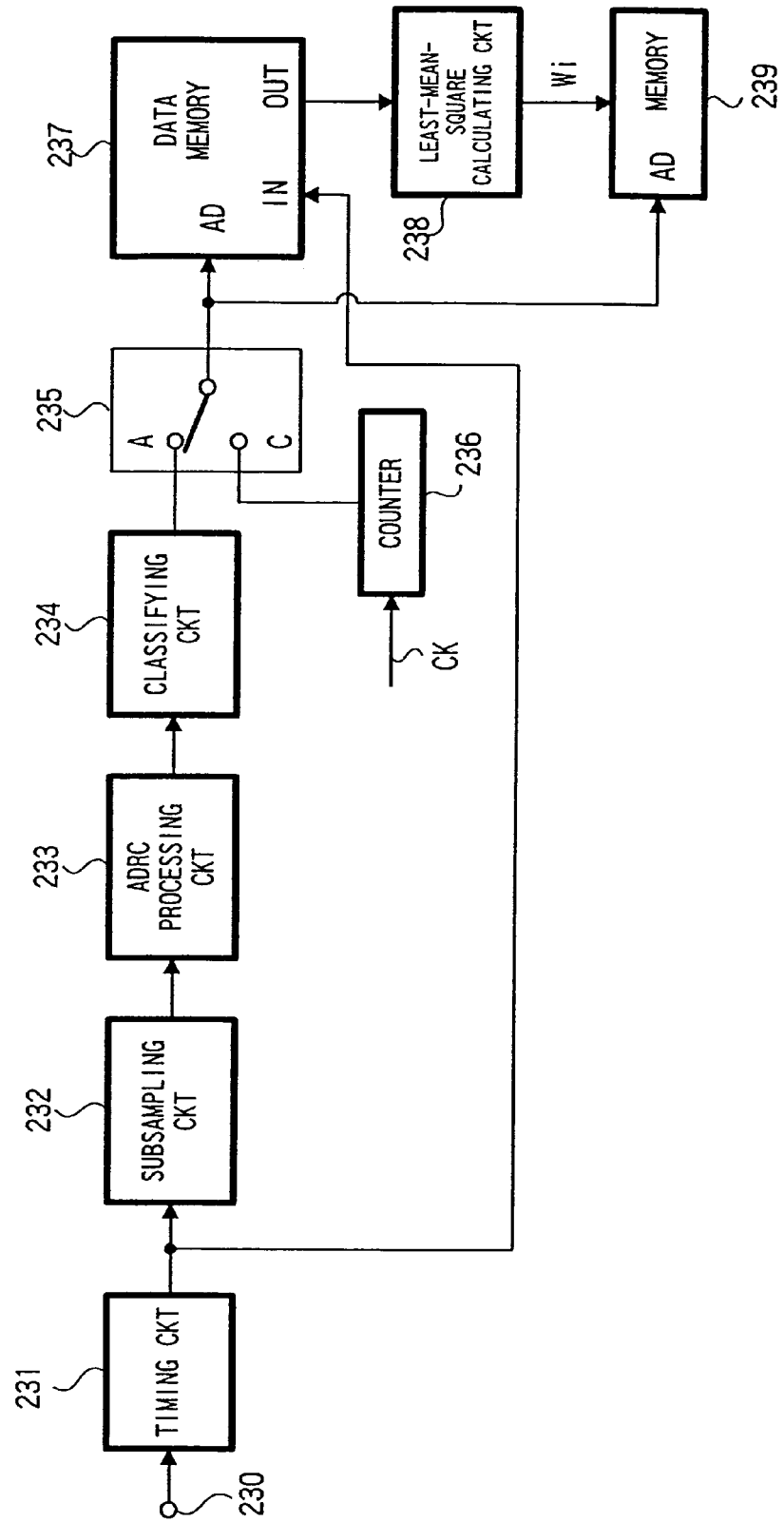
FIG. 4 is a block diagram of an apparatus for generating contents stored in a ROM 218 shown in FIG. 1.

In the embodiment shown in FIG. 4, a digital video signal is supplied from an input terminal 230 to a timing circuit 231. The digital video signal supplied to the input terminal 230 should preferably be a standard signal required to generate a table (hence a signal of an image of higher resolution prior to being decimated). For example, the digital video signal may be a signal representing a still image of a standard pattern. The timing circuit 231 adjusts timing of the digital video signal such that it will output the pixel data Y1 and X1 through X4 shown in FIG. 2 at the same time. The pixel data outputted from the timing circuit 231 are supplied to a subsampling circuit 232 and a data memory 237. The subsampling circuit 232 extracts the pixel data X1 through X4 shown in FIG. 2 from the supplied image signal of higher resolution, and supplies the pixel data X1 through X4 to an ADRC processing circuit 233.

The ADRC processing circuit 233 effects a 1-bit ADRC process on the supplied pixel data, and outputs processed data to a classifying circuit 234. The classifying circuit 234 classify the data supplied from the ADRC processing circuit 233 into a class, and outputs a signal representative of the class as an address to the data memory 237. The timing circuit 232, the ADRC processing circuit 233, and the classifying circuit 234 effect the same processing operations as the timing circuit 215, the ADRC processing circuit 216, and the classifying circuit 217 shown in FIG. 1.

A counter 236 counts clock pulses CK supplied from a circuit (not shown), and supplies the count through a contact C of a switch 235 as an address to the data memory 237.

When supplied with an address from the classifying circuit 234 through the switch 235, the data memory 237 writes data supplied from the timing circuit 232 at the address. When supplied with an address from the counter 236 through the switch 235, the data memory 237 reads data stored at the address, and outputs the read data to a least-mean-square calculating circuit 238. The least-mean-square calculating circuit 238 processes the pixel data supplied from the data memory 237 according to the method of least squares to calculate a predictive coefficient wi, and outputs the predictive coefficient wi to a memory 239. The memory 239 writes the predictive coefficient wi supplied from the least-mean-square calculating circuit 238 at the address supplied from the counter 236 through the switch 235.

Operation of the apparatus shown in FIG. 4 will be described below. Digital video data in a learning process for determining a predictive coefficient is synchronized by the timing circuit 231, decimated by the subsampling circuit 232 to extract pixel data X1 through X4 shown in FIG. 2, subjected to a 1-bit ADRC process by the ADRC processing circuit 233, and classified by the classifying circuit 234. As with the system shown in FIG. 1, four pixels are handled as one block for classification, and the R, G, B components of each of the pixels are processed according to a 1-bit ADRC process by the ADRC processing circuit 233. Therefore, 12-bit class data from the classifying circuit 234 is supplied as an address through a contact A of the switch 235 to the data memory 237. The data memory 237 stores pixel data supplied from the timing circuit 232 at the address.

The pixel data to be stored is pixel data which represents an image of higher spatial resolution to be sub-sampled by the subsampling circuit 202 shown in FIG. 1. Therefore, the pixel data Xi indicated by ○ and the pixel data Yi indicated by X in FIG. 2 are stored.

As indicated by the above equations, there are 12 coefficients w1(R) through w12(R) for calculating image data of one component, e.g., YR1. In order to determine these 12 predictive coefficients, 12 simultaneous equations with 12 predictive coefficients contained as unknowns are required in each class. The data memory 237 stores at least as many pixel data as necessary for solving the simultaneous equations.

After a necessary number of pixel data are stored in the data memory 237, the switch 235 is shifted to the contact C. Since the counter 236 is counting clock pulses CK and outputting its count, the data memory 237 is supplied with an address which is successively incremented by 1 at a time. The data memory 237 reads pixel data from successively supplied addresses, and outputs the pixel data to the least-mean-square calculating circuit 238. The least-mean-square calculating circuit 238 applies the pixel data to the above equations, generating simultaneous equations with predictive coefficients wi contained as variables, and solves the simultaneous equations for the predictive coefficients wi.

The least-mean-square calculating circuit 238 determines (predicts) certain pixel data (e.g., the R component YR1 of the pixel data Y1) using the calculated predictive coefficients wi. The least-mean-square calculating circuit 238 then calculates an error between the calculated (predicted) value of YR1 and the actual pixel data YR1, and calculates a predictive coefficient wi such that the square of the error will be minimized. The calculated predictive coefficient wi is written at an address of the memory 239 which corresponds to the address of the pixel data read from the data memory 237. In this manner, the memory 239 stores predictive coefficients wi. The stored contents are then written in the ROM 218 shown in FIG. 1.

In the above embodiment, the predictive coefficients wi are written in the ROM 218 (the memory 239). However, the data produced when multiplied by the coefficients may be written in the ROM 218, so that the data generating circuit 219 shown in FIG. 1 may be dispensed with.

Figure 5:
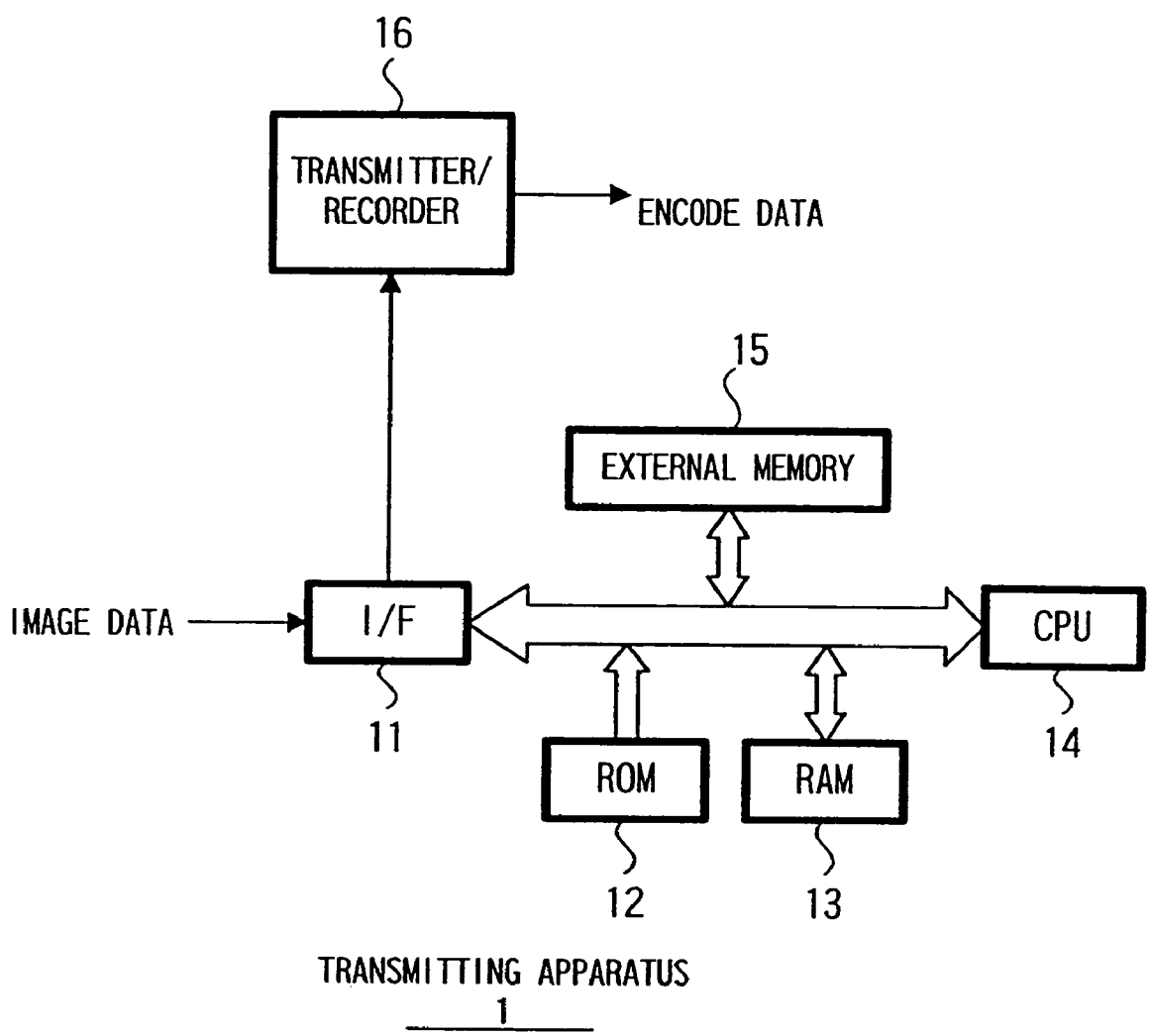
FIG. 5 is a block diagram of another arrangement for a transmitting apparatus 1 shown in FIG. 1.

FIG. 5 shows another arrangement for the transmitting apparatus 1 shown in FIG. 1.

An I/F (InterFace) 11 serves to receive image data supplied from an external source and transmit encoded data to a transmitter/recorder 16. A ROM (Read Only Memory) 12 stores a program for an IPL (Initial Program Loading) and other data. A RAM (Random Access Memory) 13 serves to store a system program (OS (Operating System)) and an application program which are recorded in an external memory 15, and data required for the operation of a CPU (Central Processing Unit) 14. The CPU 14 loads the system program and the application program from the external memory 15 into the RAM 13 according to the IPL program stored in the ROM 12, and executes the application program under the control of the system program to encode image data supplied from the I/F 11, as described later on. The external memory 15 comprises a magnetic disk unit, for example, and stores the system program and the application program which will be executed by the CPU 14 and also data required for the operation of the CPU 14. The transmitter/recorder 16 serves to record encoded data supplied from the I/F 11 or transmit the encoded data over the transmission path 3.

The I/F 11, the ROM 12, the RAM 13, the CPU 14, and the external memory 15 are interconnected by a bus.

In the transmitting apparatus 1 thus constructed, when image data is supplied to the I/F 11, the image data is supplied to the CPU 14. The CPU 14 encodes the image data and supplies the encoded data to the I/F 11. When the I/F 11 receives the encoded data, the I/F 11 supplies the encoded data to the transmitter/recorder 16, which records the encoded data in the recording medium 2 or transmits the encoded data over the transmission path 3.

Figure 6:
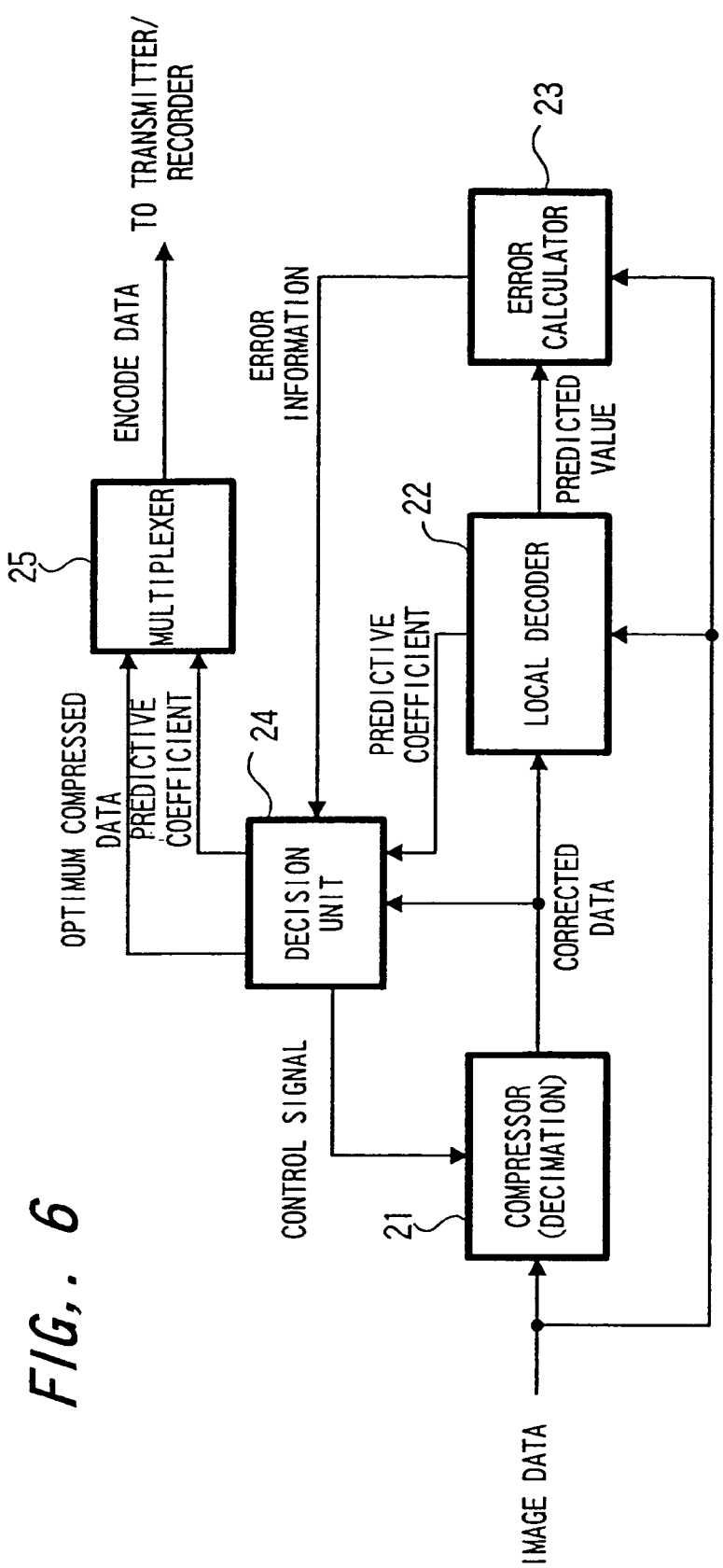
FIG. 6 is a block diagram of functional blocks of the transmitting apparatus 1 shown in FIG. 5.

FIG. 6 shows functional blocks of the transmitting apparatus 1 shown in FIG. 5, except for the transmitter/recorder 16.

Image data to be encoded is supplied to a compressor 21, a local decoder 22, and an error calculator 23. The compressor 21 compresses the image data by simply decimating pixels thereof, and corrects compressed data (image data generated after pixels are decimated) under the control of a decision unit 24. Corrected data produced by the compressor 21 is supplied to the local decoder 22 and the decision unit 24.

The local decoder 22 predicts the original image based on the corrected data from the compressor 21, and supplies a predicted value to the error calculator 23. As described later on, the local decoder 22 effects an adaptive process for determining a predictive coefficient to calculate the predicted value based on a linear coupling with the corrected data, and determines the predicted value based on the predictive coefficient. The local decoder 22 supplies the predicted value to the error calculator 23 and also supplies the predictive coefficient to the decision unit 24.

The error calculator 23 calculates a predicted error for the predicted value from the local decoder 22 with respect to the original image data (original image) supplied thereto. The predicted error is supplied as error information to the decision unit 24.

Based on the error information from the error calculator 23, the decision unit 24 decides whether it is appropriate to use the corrected data outputted from the compressor 21 as encoded data of the original image. If the decision unit 24 determines that it is not appropriate to use the corrected data outputted from the compressor 21 as encoded data of the original image, then the decision unit 24 controls the compressor 21 to correct the compressed data and output newly corrected data. If the decision unit 24 determines that it is appropriate to use the corrected data outputted from the compressor 21 as encoded data of the original image, then the decision unit 24 supplies the corrected data from the compressor 21 as optimum compressed data (hereinafter referred to as "optimum compressed data") to a multiplexer 25, and also supplies the predictive coefficient from the local decoder 22 to the multiplexer 25.

The multiplexer 25 multiplexes the optimum compressed data (corrected data) and the predictive coefficient from the decision unit 24, and supplies multiplexed data as encoded data to the transmitter/recorder 16 (FIG. 5).

Operation of the transmitting apparatus 1 shown in FIG. 5 will be described below with reference to FIG. 7. When the compressor 21 is supplied with image data, the compressor 21 compresses the image data by decimating pixel data in a step S1, and outputs decimated image data, without correcting same at first, to the local decoder 22 and the decision unit 24. The local decoder 22 locally decodes the corrected data (at an initial stage, the compressed data produced by simply decimating the image data, as described above) from the compressor 21 in a step S2.

Specifically, in the step S2, the local decoder 22 effects an adaptive process for determining a predictive coefficient to calculate a predicted value for the original image based on a linear coupling with the corrected data from the compressor 21, and determines the predicted value based on the predictive coefficient. The local decoder 22 supplies the predicted value to the error calculator 23 and also supplies the predictive coefficient to the decision unit 24.

An image composed of the predicted value outputted from the local decoder 22 is identical to the decoded image produced by the receiving apparatus 4.

When the error calculator 23 receives the predicted value for the original image from the local decoder 22, the error calculator 23 calculates a predicted error for the predicted value from the local decoder 22 with respect to the original image data, and supplies the predicted error as error information to the decision unit 24 in a step S3. Upon reception of the error information from the error calculator 23, the decision unit 24 decides whether it is appropriate to use the corrected data outputted from the compressor 21 as encoded data of the original image, based on the error information, in a step S4.

Specifically, the decision unit 24 decides whether the error information is smaller than a predetermined threshold $\epsilon$ or not in the step S4. If the error information is not smaller than the predetermined threshold $\epsilon$, then the decision unit 24 determines that it is not appropriate to use the corrected data outputted from the compressor 21 as encoded data of the original image, and control proceeds to a step S5 in which the decision unit 24 controls the compressor 21 to correct the compressed data. Under the control of the decision unit 24, the compressor 21 varies a corrective quantity (corrective value $\Delta$ described later on), corrects the compressed data, and outputs resultant corrected data to the local decoder 22 and the decision unit 24. Control then returns to the step S2, and repeats the above cycle.

If the error information is smaller than the predetermined threshold $\epsilon$ in the step S4, then the decision unit 24 determines that it is appropriate to use the corrected data outputted from the compressor 21 as encoded data of the original image, and outputs the corrected data produced when the error information smaller than the predetermined threshold $\epsilon$ is obtained, as optimum compressed data together with the predictive coefficient to the multiplexer 25. The multiplexer 25 multiplexes the optimum compressed data and the predictive coefficient from the decision unit 24, and outputs multiplexed data as encoded data in a step S6. Then, the operation sequence comes to an end.

Inasmuch as corrected compressed data produced when the error information is smaller than the predetermined threshold $\epsilon$ is used as encoded data of the original image, the receiving apparatus 4 can produce an image which is essentially the same as the original image based on the corrected data.

Figure 8:
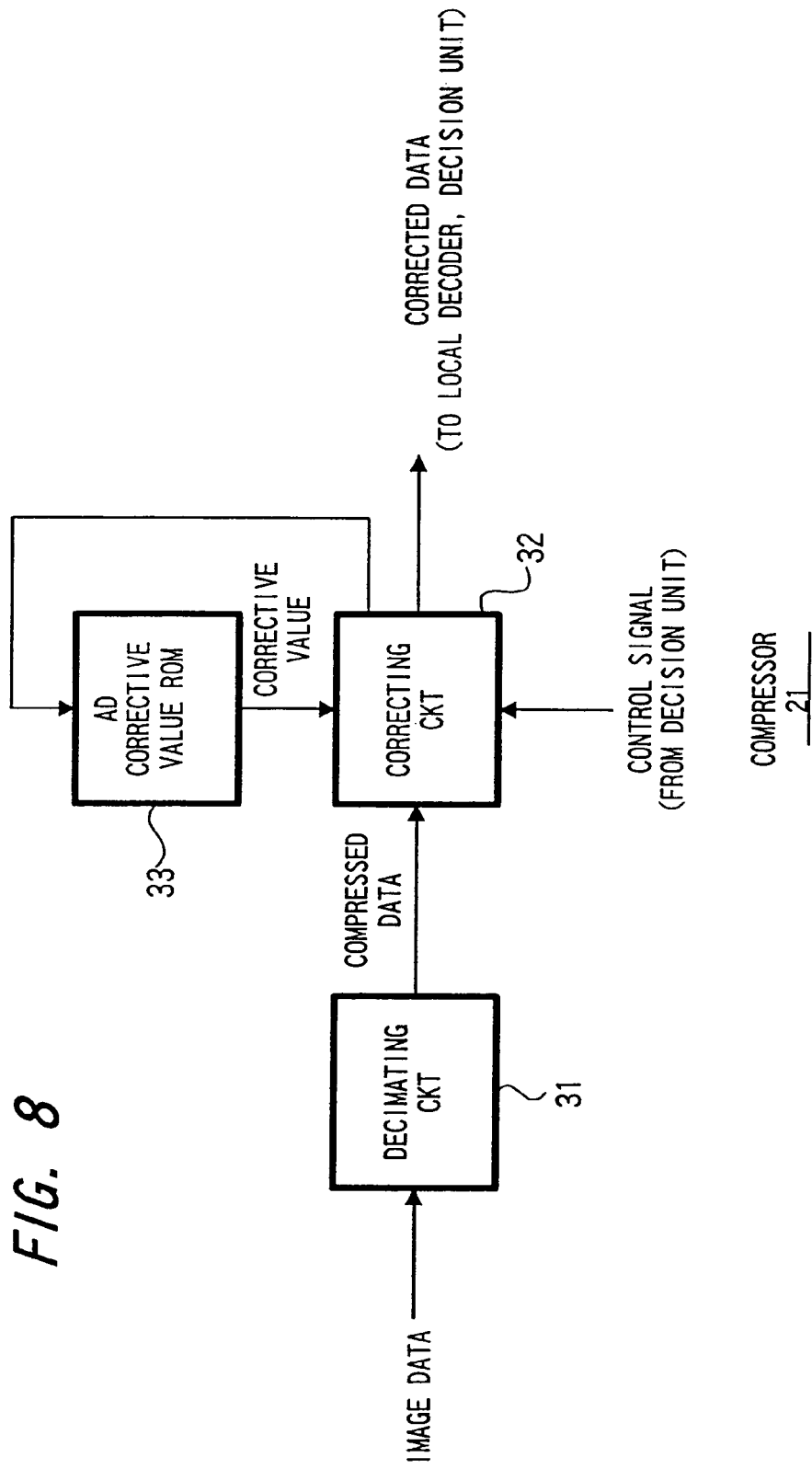
FIG. 8 is a block diagram of a compressor 21 shown in FIG. 6.

FIG. 8 shows an arrangement of the compressor 21 shown in FIG. 6.

Image data to be encoded is supplied to a decimating circuit 31, which decimates the supplied image data to 1/N (½ in the embodiment). Therefore, the decimating circuit 31 outputs compressed data representing 1/N of the image data. The compressed data is supplied from the decimating circuit 31 to a correcting circuit 32.

The correcting circuit 32 gives an address to a corrective value ROM 33 in accordance with a control signal from the decision unit 24 (FIG. 6) to read a corrective value $\Delta$ therefrom. The correcting circuit 32 adds, for example, the corrective value $\Delta$ from the corrective value ROM 33 to the compressed data from the decimating circuit 31, generating corrected data, and supplies the corrected data to the local decoder 22 and the decision unit 24. The corrective value ROM 33 stores a combination of various corrective values $\Delta$ (e.g., a combination of corrective values for correcting one frame of compressed data) for correcting the compressed data outputted from the decimating circuit 31, reads a combination of corrective values $\Delta$ at an address supplied from the correcting circuit 32, and supplies the read combination of corrective values $\Delta$ to the correcting circuit 32.

Figure 9:
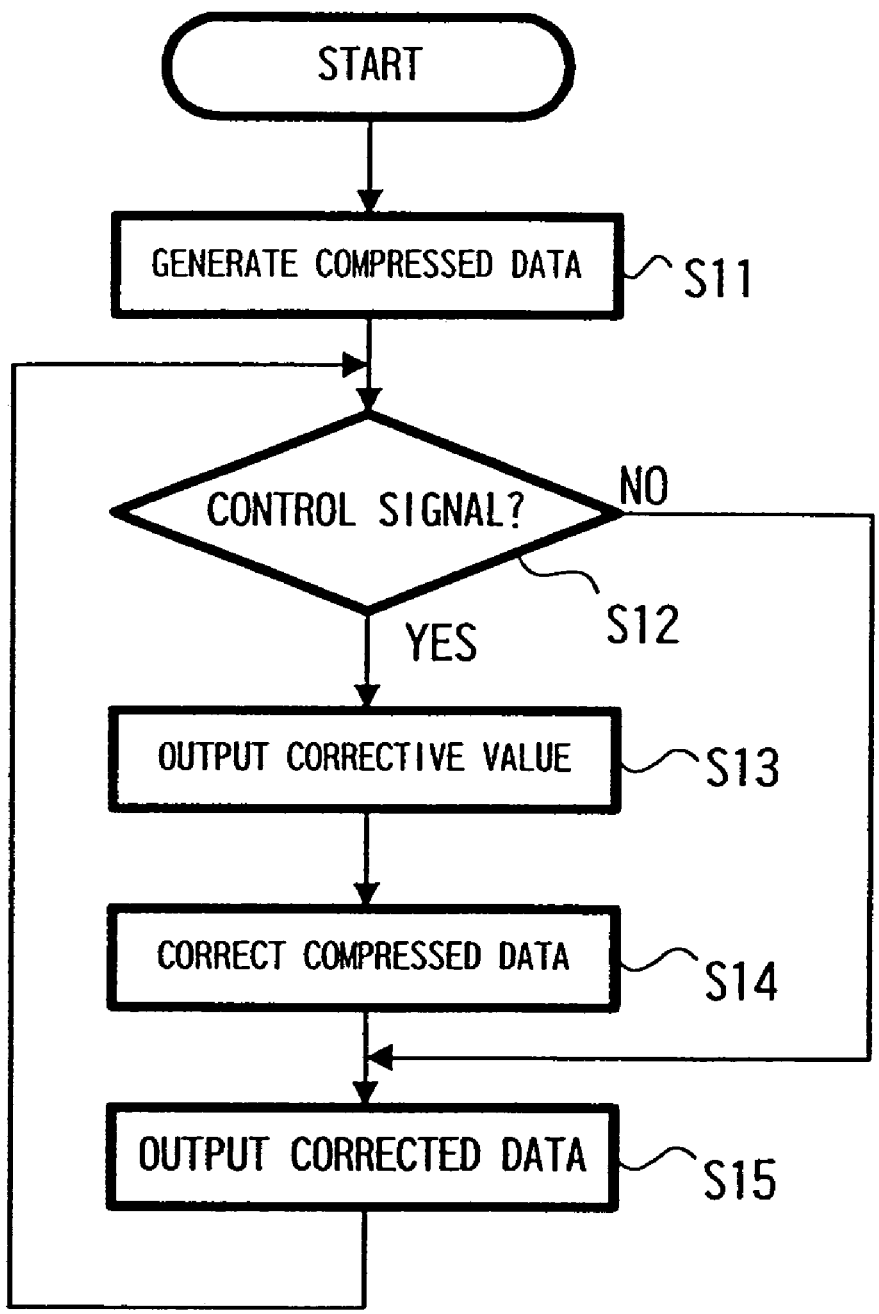
FIG. 9 is a flowchart of an operation sequence of the compressor 21 shown in FIG. 8.

An operation sequence of the compressor 21 shown in FIG. 8 will be described below with reference to FIG. 9.

When one frame (field) of image data, for example, is supplied to the decimating circuit 31, the decimating circuit 31 decimates the image data to 1/N and outputs compressed data to the correcting circuit 32 in a step S11.

As shown in FIG. 2, the decimating circuit 31 decimates each line of the image data to ½. The decimating circuit 31 processes the image data for each frame (field), for example. The decimating circuit 31 supplies the correcting circuit 32 with compressed data which is ½ of one frame of image data. The decimating circuit 31 may decimate each of blocks of image data which are divided from one frame of image data.

When the correcting circuit 32 receives the compressed data from the decimating circuit 31, the correcting circuit 32 decides whether it has received a control signal from the decision unit 24 (FIG. 6) or not in a step S12. If the correcting circuit 32 has not received a control signal, then control jumps to a step S15 in which the correcting circuit 32 outputs the compressed data from the decimating circuit 31 as corrected data to the local decoder 22 and the decision unit 24. Thereafter, control returns to the step S12.

As described above, the decision unit 24 controls the compressor 21 (the correcting circuit 32) based on the error information. Immediately after the compressed data is outputted from the decimating circuit 31, no error information is available (no error information is outputted from the error calculator 23), and hence the decision unit 24 does not output a control signal. Therefore, immediately after the compressed data is outputted from the decimating circuit 31, the correcting circuit 32 does not correct the compressed data (adds 0 to the compressed data), and outputs the compressed data as corrected data to the local decoder 22 and the decision unit 24.

If the correcting circuit 32 has received a control signal in the step S12, then the correcting circuit 32 outputs an address according to the control signal to the corrective value ROM 33 in a step S13. In the step S13, a combination (collection) of corrective values $\Delta$ for correcting one frame of compressed data, stored at the address, is read from the corrective value ROM 33, and supplied to the correcting circuit 32. When the correcting circuit 32 receives the combination of corrective values Δ from the corrective value ROM 33, the correcting circuit 32 adds corresponding corrective values Δ to respective compressed data of one frame, thus calculating corrected data in a step S14. Thereafter, control proceeds to the step S15 in which the corrected data is outputted from the correcting circuit 32 to the local decoder 22 and the decision unit 24, after which control goes back to the step S12.

In this manner, the compressor 21 repeats the outputting of corrected data, indicative of various values at which the compressed data is corrected, under the control of the decision unit 24.

When one cycle of encoding one frame of image data is finished, the decision unit 24 supplies a control signal representing the end of the encoding cycle to the compressor 21. In response to the control signal, the compressor 21 effects the operation sequence shown in FIG. 9 on a next frame of image data.

In the above embodiment, the decimating circuit 31 extracts pixel data (pixel value) of every other pixel to generate compressed data. However, the decimating circuit 31 may calculate an average value of 3×3 pixels and generate compressed data using the average value as the value of a central one of the 3×3 pixels.

Figure 10:
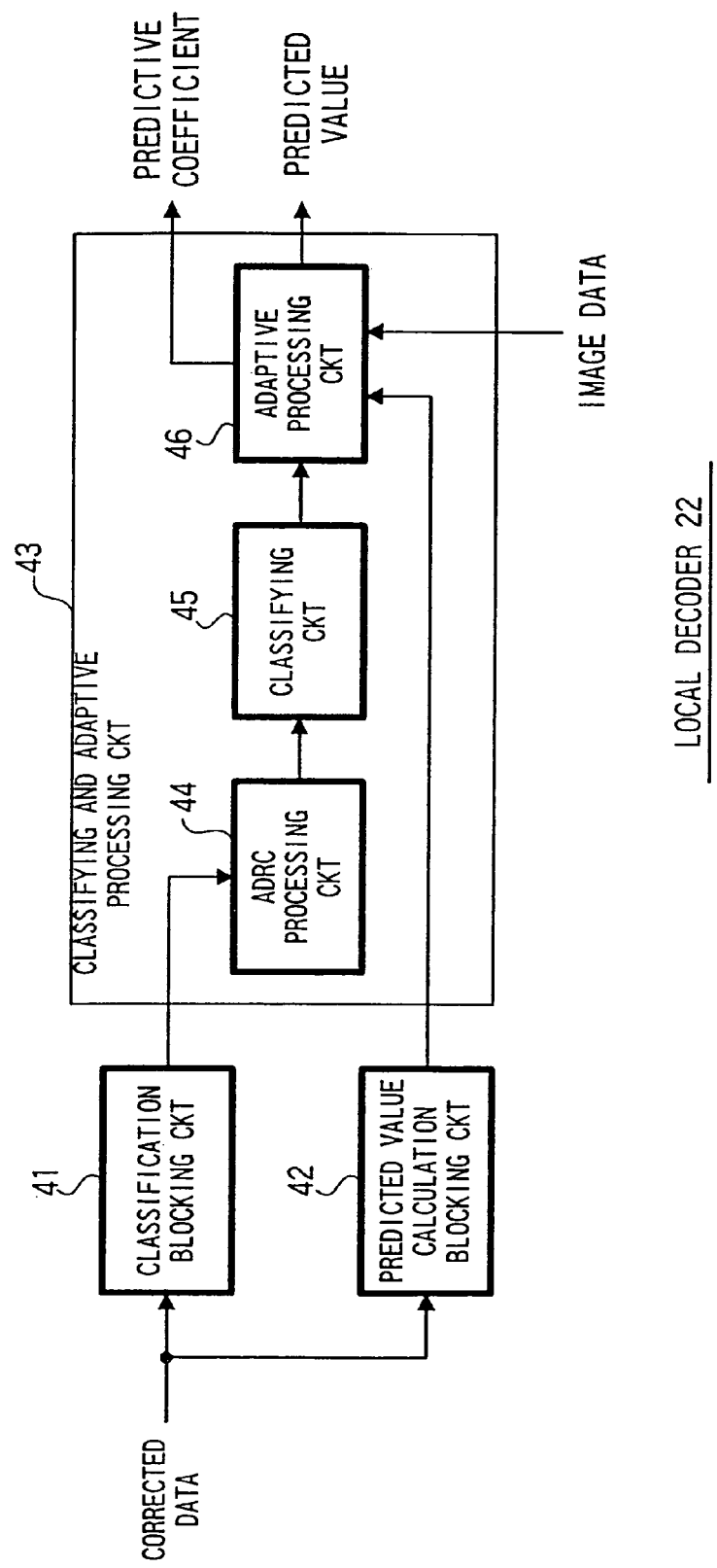
FIG. 10 is a block diagram of a local decoder 22 shown in FIG. 6.

FIG. 10 shows an arrangement of the local decoder 22 shown in FIG. 6.

Corrected data from the compressor 21 is supplied to a classification blocking circuit 41 and a predicted value calculation blocking circuit 42. The classification blocking circuit 41 converts the corrected data into a classification block which is a unit for classifying the corrected data into a given class.

Specifically, the classification blocking circuit 41 produces a classification block composed of the four pixels X1, X2, X3, X4 shown in FIG. 2, and supplies the classification block to a classifying and adaptive processing circuit 43.

The classification block comprises a crisscross block of four pixels. However, the classification block may be of any of arbitrary shapes including a rectangular shape, a square shape, etc. Furthermore, the number of pixels that make up a classification block is not limited to four.

The predicted value calculation blocking circuit 42 converts the corrected data into a predicted value calculation block which is a unit for calculating a predicted value for the original image. In this embodiment, the predicted value calculation block is the same as the classification block, and comprises the four pixels X1, X2, X3, X4 shown in FIG. 2.

Since the predicted value calculation blocking circuit 42 blocks the same area as the classification blocking circuit 41, they may be implemented as a common circuit.

The predicted value calculation block generated by the predicted value calculation blocking circuit 42 is supplied to the classifying and adaptive processing circuit 43.

As with the classification block, the predicted value calculation block is not limited to the above number of pixels and the above shape. However, it is preferable that the number of pixels making up the predicted value calculation block be at least the number of pixels making up the classification block.

In the above blocking process (and also in other processes), corresponding pixels may not be present in the vicinity of the image frame of an image. In such a case, the processes are carried out on the assumption that pixels identical to those which make up the image frame are present outside of the image frame.

The classifying and adaptive processing circuit 43 comprises an ADRC (Adaptive Dynamic Range Coding) processing circuit 44, a classifying circuit 45, and an adaptive processing circuit 46, and effects a classifying and adaptive processing process.

The classifying and adaptive processing process classifies input signals into several classes based on features thereof, and effects adaptive processing processes suitable for the classes on the input signals. The classifying and adaptive processing process is roughly composed of a classifying process and an adaptive processing process.

The classifying process and the adaptive processing process will briefly be described below.

The classifying process will first be described below.

Figure 11A:
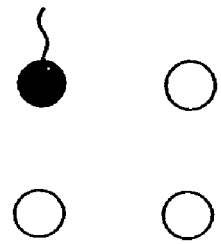
FIGS. 11A and 11B are diagrams illustrative of a classification process.
Figure 11B:
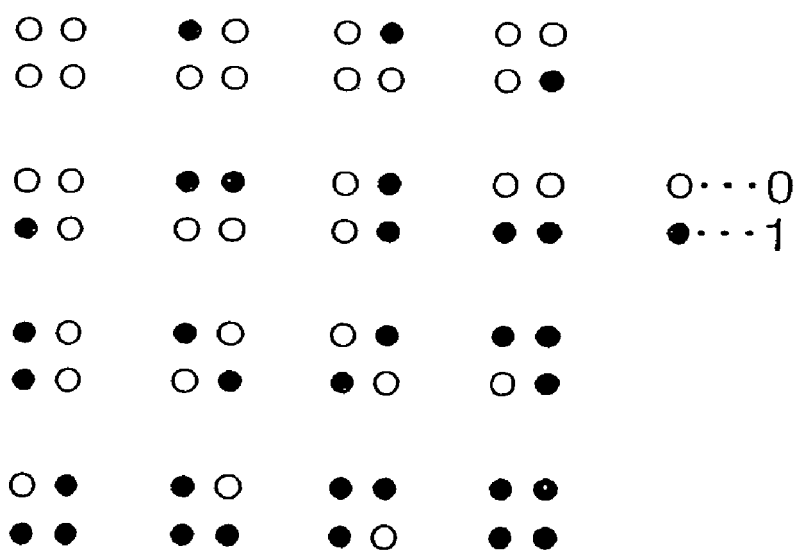

It is assumed that, as shown in FIG. 11A, an attentional pixel and three pixels adjacent thereto make up a block (classification block) of 2×2 pixels, and each of the pixels is expressed by 1 bit (having a level of either 0 or 1). The block of four pixels, i.e., 2×2 pixels, can be classified into 16 (=(2¹)⁴) patterns depending on the level distribution of the pixels, as shown in FIG. 1B. The classification of blocks into patterns is the classifying process, and carried out by the classifying circuit 45.

The classifying process may be carried out in view of the activity (image complexity) (image changing intensity) of an image (an image in the block).

Usually, each pixel is assigned 8 bits, for example. In this embodiment, the classification block comprises nine pixels, i.e., 3×3 pixels. If such classification blocks were classified, then they would be classified into a huge number of classes, i.e., $(2^8)^9$ classes.

According to the present embodiment, the ADRC processing circuit 44 effects an ADRC process on a classification block. The number of classes is reduced by reducing the number of pits of pixels that make up the classification block.

Figure 12A:
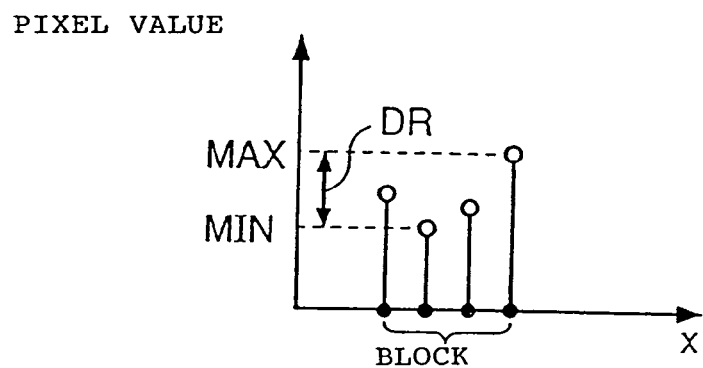
FIGS. 12A through 12C are diagrams illustrative of an ADRC process.

For the sake of brevity, a block of four pixels arrayed on a straight light as shown in FIG. 12A is considered. In the ADRC process, maximum and minimum pixel values MAX, MIN are detected, and, based on a local dynamic range DR=MAX−MIN of the block, the pixel values of the pixels of the block are quantized again into K bits.

Figure 12B:
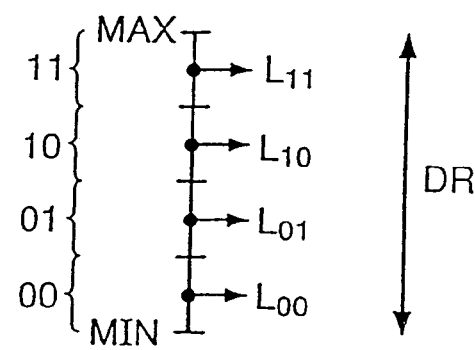

More specifically, the minimum value MIN is subtracted from the pixel value of each pixel in the block, and the difference is divided by DR/2K. The quotient is converted into a corresponding code (ADRC code). For example, if K=2, then as shown in FIG. 12B, it is decided which one of four (=2²) ranges divided from the dynamic range DR the quotient belongs to. If the quotient belongs to the range of the lowermost level, the range of the second level from the lowermost level, the range of the third level from the lowermost level, and the range of the uppermost level, then the quotient is converted into 2-bit codes 00B, 01B, 10B, 11B, respectively (B represents a binary notation). The codes are decoded by converting the ADRC codes 00B, 10B, 10B, 11B respectively into a central value L00 of the range of the lowermost level, a central value L01 of the range of the second level from the lowermost level, a central value L10 of the range of the third level from the lowermost level, and a central value L11 of the range of the uppermost level, and then adding the minimum value MIN to these central values.

Figure 12C:
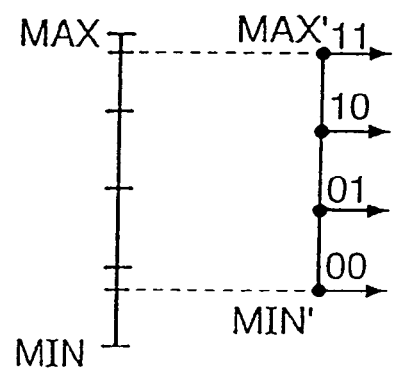

The above ADRC process is called non-edge matching. According to another ADRC process, as shown in FIG. 12C, the ADRC codes may be decoded by converting the ADRC codes 00B, 11B into average values MIN', MAX' of pixel values belonging to the ranges of the lowermost and uppermost levels and converting the ADRC codes 01B, 10B into equal (3 equal) levels divided from a dynamic ranges DR' defined as MAX'−MIN'. Such an ADRC process is called edge matching.

Details of the ADRC process are disclosed in Japanese laid-open patent publication No. 3-53778, for example, previously filed by the applicant of the present application.

The ADRC process which quantizes a block of pixels again with less bits than the pixels which are assigned to the pixels of the block, is effective to reduce the number of classes. The ADRC process is carried out by the ADRC processing circuit 44.

In this embodiment, the classifying circuit 45 classifies pixel data into a class based on ADRC codes outputted from the ADRC processing circuit 44. However, the classifying process may be effected on data which has been processed by DPCM (Differential Pulse Code Modulation), BTC (Block Truncation Coding), VQ (Vector Quantization), DCT (Discrete Cosine Transform), or Hadamard transform.

The adaptive processing process will be described below.

It is assumed that a predicted value E[y] of a pixel value y of an original image is determined from a linear primary coupling model which is defined by a linear coupling between several surrounding pixel values (hereinafter referred to as "learning data") x1, x2, . . . and predetermined predictive coefficients w1, w2, . . . . The predicted value E[y] can be expressed by the following equation:

$$E[y] = w1x1 + w2x2 + \ldots \quad (1)$$

For generalization, a matrix W composed of a set of predictive coefficients w, a matrix X composed of a set of learning data, and a matrix Y' composed of a set of predicted values E[y] are defined as follows:

$$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{pmatrix}$$

$$W = \begin{pmatrix} W_1 \\ W_2 \\ \cdots \\ W_m \end{pmatrix}, Y' = \begin{pmatrix} E[y_1] \\ E[y_2] \\ \cdots \\ E[y_n] \end{pmatrix}$$

Then, the following observation equation is satisfied:

$$XW = Y' \quad (2)$$

The method of least squares is applied to the observation equation to determine a predicted value E[y] close to the pixel values y of the original image. If a matrix Y composed of a set of pixel values of the original image (hereinafter referred to as "teacher data") and a matrix E composed of a set of residuals e of the predicted value E[y] with respect to the pixel value y of the original image are defined by:

$$e = \begin{pmatrix} e_1 \\ e_2 \\ \cdots \\ e_m \end{pmatrix}, Y = \begin{pmatrix} y_1 \\ y_2 \\ \cdots \\ y_n \end{pmatrix}$$

then the following residual equation is satisfied from the equation (2):

$$XW = Y + E \quad (3)$$

A predictive coefficient wi for determining the predicted value E[y] close to the pixel value y of the original image is determined by minimizing a square error:

$$\sum_{i=1}^{m} e^2 i$$

Therefore, a predictive coefficient wi with which the square error is differentiated to result in 0, i.e., a predictive coefficient wi which satisfies the following equation, is of an optimum value for determining the predicted value E[y] close to the pixel value y of the original image:

$$e_1 \frac{\partial e_1}{\partial w_i} + e_2 \frac{\partial e_2}{\partial w_i} + \cdots + e_m \frac{\partial e_m}{\partial w_i} = 0 \ (i = 1, 2, \cdots, n) \quad (4)$$

When the equation (3) is differentiated with the predictive coefficient wi, the following equation is satisfied:

$$\frac{\partial e_1}{\partial w_i} = x_{i1}, \frac{\partial e_i}{\partial w_2} = x_{i2}, \cdots, \frac{\partial e_i}{\partial w_n} = x_{in} \ (i = 1, 2, \cdots, m) \quad (5)$$

From the equations (4) and (5), the following equation (6) is derived.

$$\sum_{i=1}^{m} e_i x_{i1} = 0, \sum_{i=1}^{m} e_i x_{i2} = 0, \cdots, \sum_{i=1}^{m} e_i x_{in} = 0 \quad (6)$$

In view of the relationship between the learning data x, the predictive coefficient w, the teacher data y, and the residual e in the residual equation (3), the following normal equations can be derived from the equation (6):

$$\begin{cases} \left(\sum_{i=1}^{m} x_{i1}x_{i1}\right)w_i + \left(\sum_{i=1}^{m} x_{i1}x_{i2}\right)w_2 + \cdots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_i + \left(\sum_{i=1}^{m} x_{i2}x_{i2}\right)w_2 + \cdots + \left(\sum_{i=1}^{m} x_{i2}x_{in}\right)w_n = \left(\sum_{i=1}^{m} x_{i2}y_i\right) \\ \cdots \\ \left(\sum_{i=1}^{m} x_{in}x_{i1}\right)w_i + \left(\sum_{i=1}^{m} x_{in}x_{i2}\right)w_2 + \cdots + \left(\sum_{i=1}^{m} x_{in}x_{in}\right)w_n = \left(\sum_{i=1}^{m} x_{in}y_i\right) \end{cases} \quad (7)$$

As many normal equations (7) as the number of predictive coefficients w to be determined may be established. Therefore, an optimum predictive coefficient w can be determined by solving the equations (7). It is possible to apply the sweeping-out method (the Gauss-Jordan's elimination method) to solve the equations (7).

According to the adaptive processing process, an optimum predictive coefficient w is determined in the manner described above, and using the optimum predictive coefficient w, a predicted value E[y] close to the pixel value y of the original image is determined. The adaptive processing process is carried out by the adaptive processing circuit 46.

The adaptive processing process differs from an interpolating process in that it reproduces components not contained in a decimated image, but contained in the original image. Insofar as the equation (1) is concerned, the adaptive processing process is identical to an interpolating process using a so-called interpolating filter. However, since predictive coefficients w corresponding to the tap coefficients of the interpolating filter are determined by a learning process using the teacher data y, the adaptive processing process is able to reproduce components contained in the original image. Therefore, the adaptive processing process may be regarded as a process of creating images.

Figure 13:
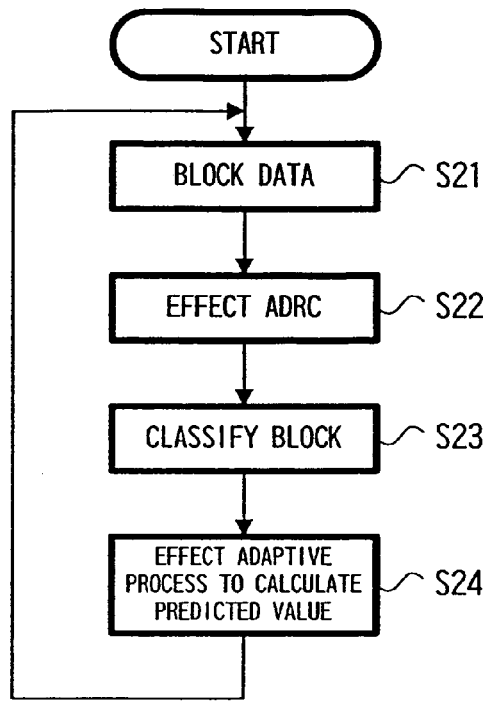
FIG. 13 is a flowchart of an operation sequence of the local decoder 22 shown in FIG. 10.

An operation sequence of the local decoder 22 shown in FIG. 10 will be described below with reference to FIG. 13.

The local decoder 22 initially converts corrected data from the compressor 21 into a block in a step S21. Specifically, the classification blocking circuit 41 converts the corrected data into a classification block of four pixels, and supplies the classification block to the classifying and adaptive processing circuit 43. The predicted value calculation blocking circuit 42 converts the corrected data into a predicted value calculation block of four pixels, and supplies the predicted value calculation block to the classifying and adaptive processing circuit 43.

The classifying and adaptive processing circuit 43 is supplied with a classification block and a predicted value calculation block and also with original image data. The classification block is supplied to the ADRC processing circuit 44, and the predicted value calculation block and the original image data are supplied to the adaptive processing circuit 46.

When the ADRC processing circuit 44 receives a classification block, the ADRC processing circuit 44 effects a 1-bit ADRC process (ADRC for quantizing data again with 1 bit) on the classification block to convert (encode) the corrected data into a 1-bit classification block, and outputs the 1-bit classification block to the classifying circuit 45 in a step S22. The classifying circuit 45 classifies the classification block subjected to the ADRC process, and determines a class to which the classification block belongs in a step S23. The determined class is supplied as class information to the adaptive processing circuit 46.

In this embodiment, since a classification block composed of four pixels whose R, G, B components are subjected to the 1-bit ADRC process is classified, the classification block is classified into one of 4096 (=(2³)⁴) classes.

Control then goes to a step S24 in which the adaptive processing circuit 46 effects an adaptive process on each class based on the class information from the classifying circuit 45 for thereby calculating a predictive coefficient and a predicted value for the original image data.

In this embodiment, when attention is paid to a certain pixel, the adaptive process is carried out using a predicted value calculation block of adjacent four pixels around the attentional pixel.

Specifically, it is assumed that class information C with respect to a classification block which comprises the four corrected data X1, X2, X3, X4 shown in FIG. 4 is outputted from the classifying circuit 45, and a predicted value calculation block which comprises the corrected data X1, X2, X3, X4 of four pixels is outputted from the predicted value calculation blocking circuit 42. Using the corrected data of the predicted value calculation block as learning data, and the corrected data Y1 of the original image as teacher data, a normal equation (7) is established.

A normal equation is also established with respect to another predicted value calculation block classified into the class information C. When as many normal equations as required to calculate predictive coefficients w1(R) through w12(R) for determining a predicted value E[YR1] of a pixel value YR1 are established (the process of establishing a normal equation is carried out in the step S24 until those normal equations are established), the normal equations are solved to calculate the predictive coefficients w1(R) through w12(R) for determining a predicted value E[YR1] of a pixel value YR1 with respect to the class information C. The predicted value E[YR1] is then determined according to the equation, given below, which corresponds to the equation (1). Predicted values for YG1, YB1 are similarly determined.

$$E[YR1] = w1(R)XR1 + w2(R)XG1 + w3(R)WB1 + w4(R)XR2 + \\ w5(R)XG2 + w6(R)XB2 + w7(R)XR3 + w8(R)XG3 + \\ w9(R)XB3 + w10(R)XR4 + w11(R)XG4 + w12(R)XB4$$

$$E[YG1] = w1(G)XR1 + w2(G)XG1 + w3(G)XB1 + w4(G)XR2 + \\ w5(G)XG2 + w6(G)XB2 + w7(G)XR3 + w8(G)XG3 + \\ w9(G)XB3 + w10(G)XR4 + w11(G)XG4 + w12(G)XB4$$

$$E[YB1] = w1(B)XR1 + w2(B)XG1 + w3(B)XB1 + w4(B)XR2 + \\ w5(B)XG2 + w6(B)XB2 + w7(B)XR3 + w8(B)XG3 + \\ w9(B)XB3 + w10(B)XR4 + w11(B)XG4 + w12(B)XB4$$

When predictive coefficients with respect to the components R, G, B of the pixels are determined in the step S24, the predicted values are outputted to the error calculator 23, and the predictive coefficients are outputted to the decision unit 24. Control then goes back to the step S21 for repeating the same process.

Figure 14:
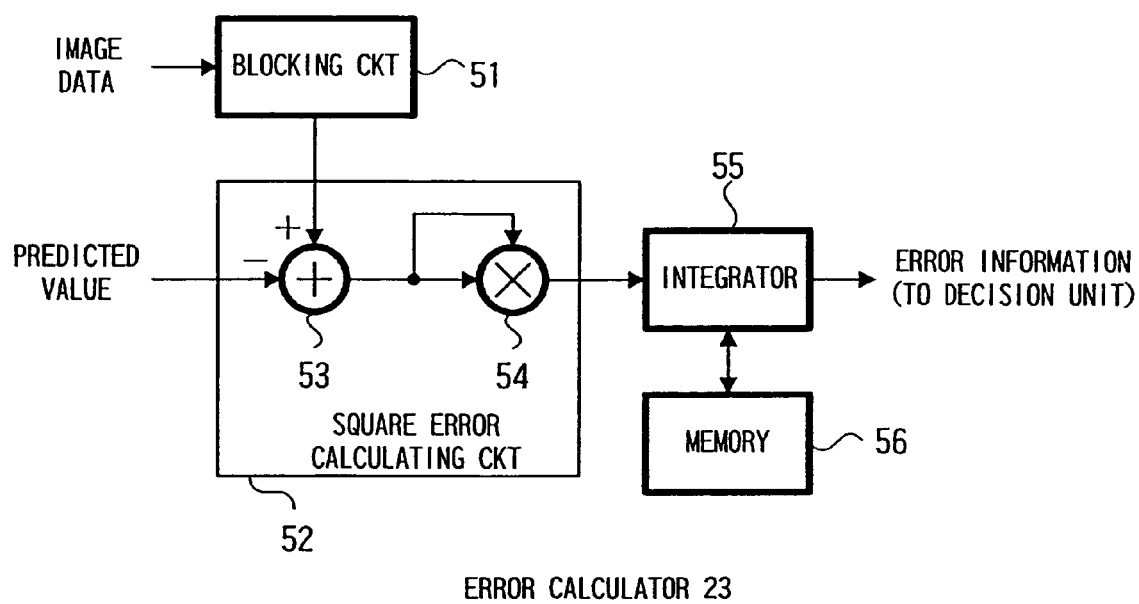
FIG. 14 is a block diagram of an error calculator 23 shown in FIG. 6.

FIG. 14 shows an arrangement of the error calculator 23 shown in FIG. 6.

A blocking circuit 51 is supplied with original image data. The blocking circuit 51 converts pixels of the image data which correspond to a predicted value outputted from the local decoder 22 into a block, and outputs the pixels of the block (in this case, the block comprises one pixel (Y1 in FIG. 2)) to a square error calculating circuit 52. The square error calculating circuit 52 is supplied with the pixel data from the blocking circuit 51 and the pixel data as the predicted value from the local decoder 22. The square error calculating circuit 52 calculates a square error as a predicted error for the predicted value, and outputs the square error to an integrator 55.

Specifically, the square error calculating circuit 52 comprises arithmetic units 53, 54. The arithmetic unit 53 subtracts a predicted value from blocked image data supplied from the blocking circuit 51, and supplies the difference to the arithmetic unit 54. The arithmetic unit 54 squares the output error from the arithmetic unit 53 (the difference between the original image data and the predicted value), and supplies the squared error to the integrator 55.

When the integrator 55 receives the squared error from the square error calculating circuit 52, the integrator 55 adds a stored value and the squared error, and supplies the sum to a memory 56. The integrator 55 repeats its operation to determine an integrated value (error variance) of square errors. When the integration of square errors is finished with respect to a certain amount of data (e.g., one frame of data), the integrator 55 reads the integrated value from the memory 56, and supplies the integrated value as error information to the decision unit 24. Each time the process for one frame is finished, the memory 56 clears its stored data, and stores an output value from the integrator 55.

Figure 15:
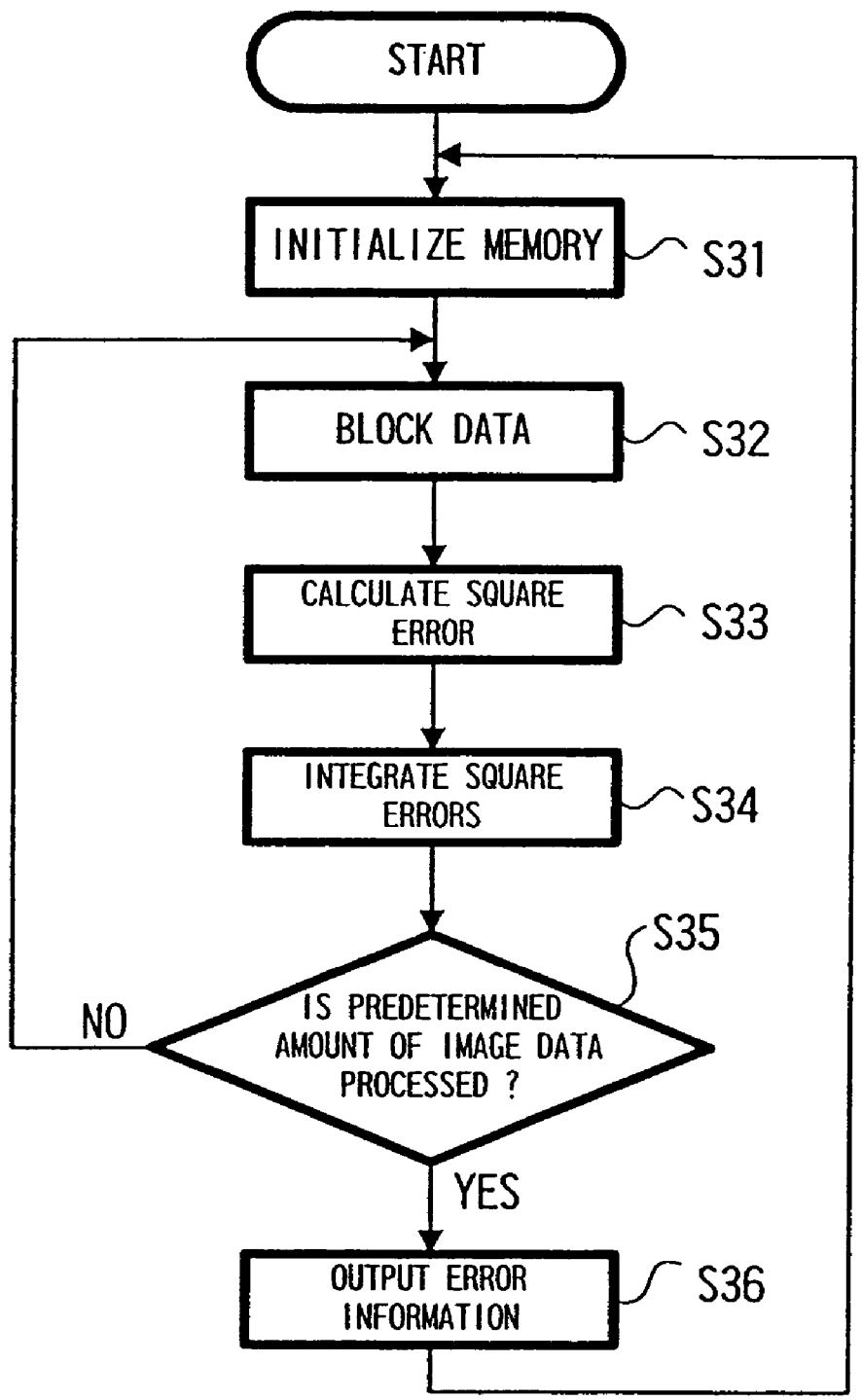
FIG. 15 is a flowchart of an operation sequence of the error calculator 23 shown in FIG. 14.

Operation of the error calculator 23 will be described below with reference to FIG. 15. At first, the stored value of the memory 56 is cleared to 0 in a step S31. Then, control proceeds to a step S32 in which the blocking circuit 51 converts image data into a block and supplies the block to the square error calculating circuit 52. The square error calculating circuit 52 calculates a square error between the image data of the original image which makes up the block supplied from the blocking circuit 51 and the predicted value supplied from the local decoder 22 in a step S33.

In the step S33, more specifically, the arithmetic unit 53 subtracts the predicted value from blocked image data supplied from the blocking circuit 51, and supplies the difference to the arithmetic unit 54. In the step S33, furthermore, the arithmetic unit 54 squares the output error from the arithmetic unit 53, and supplies the squared error to the integrator 55.

When the integrator 55 receives the squared error, the integrator 55 reads a stored value from the memory 56, adds the stored value and the squared error for thereby determining an integrated value of squared errors in a step S34. The calculated integrated value of squared errors is supplied from the integrator 55 to the memory 56, which overwrites the previously stored value with the integrated value.

In a step S35, the integrator 55 decides whether the integration of square errors for a predetermined amount of data, e.g., one frame of data, is finished or not. If the integration of square errors for one frame of data is not finished, then control returns to the step S32 to repeat the steps following the step S32. If the integration of square errors for one frame of data is finished, then control goes to a step S36 in which the integrator 55 reads the integrated value of square errors for one frame from the memory 56, and outputs the integrated value as error information to the decision unit 24. Control returns to the step S31 to repeat the steps following the step S31.

If it is assumed that the original image data is represented by Yi and the predicted value thereof by E[Yi], then the error calculator 23 effects the following calculation to calculate error information Q:

$$Q=(\Sigma(Yi)-E[Yi]))2$$

where $\Sigma$ represents summation of data for one frame.

Figure 16:
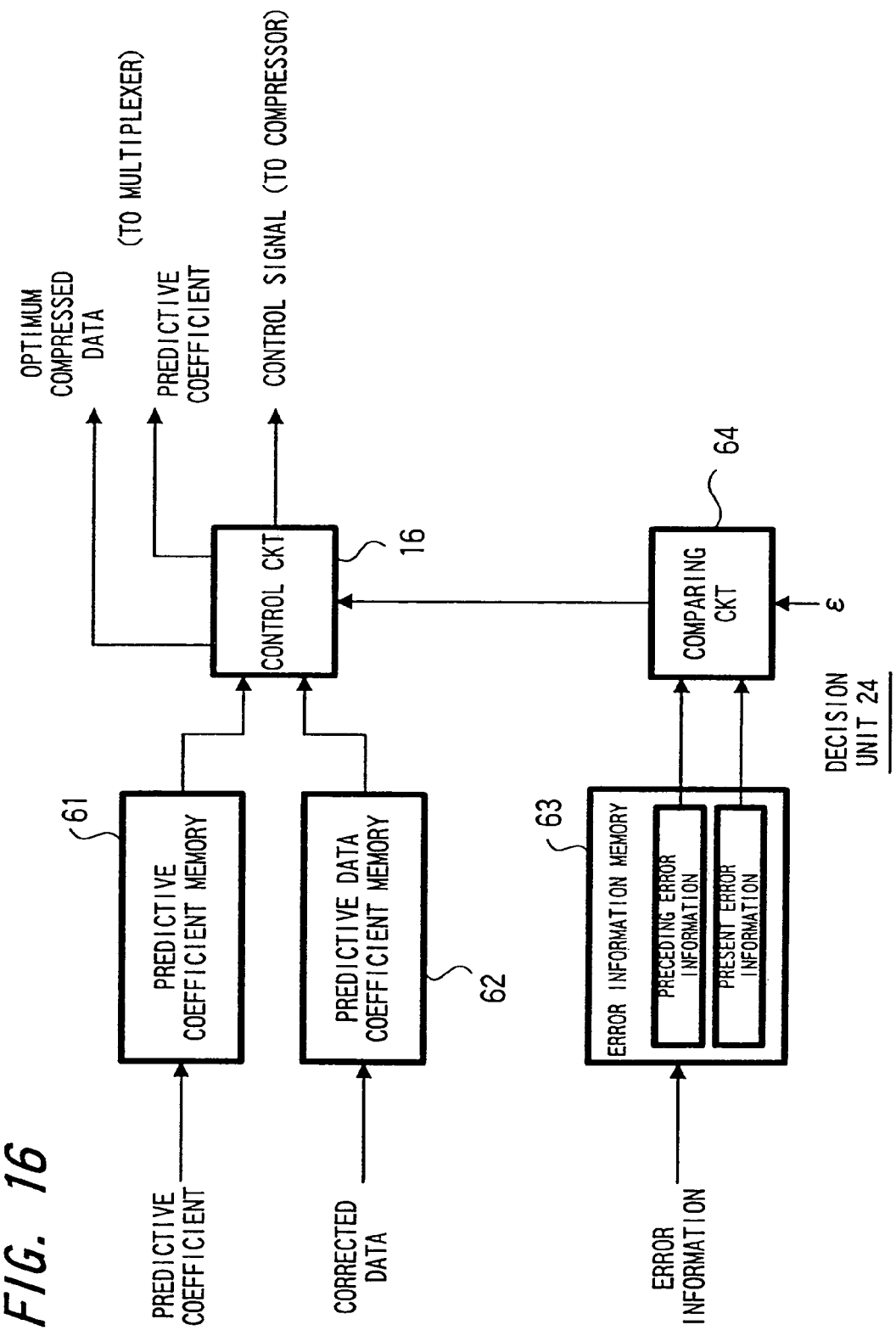
FIG. 16 is a block diagram of a decision unit 24 shown in FIG. 6.

FIG. 16 shows an arrangement of the decision unit 24 shown in FIG. 6.

A predictive coefficient memory 61 serves to store a predictive coefficient supplied from the local decoder 22. A corrected data memory 62 serves to store corrected data supplied from the compressor 21.

When compressed data is newly corrected by the compressor 21 and supplied from the compressor 21, the corrected data memory 62 stores the new corrected data instead of the already stored corrected data (preceding corrected data). At the time the corrected data is updated with the new corrected data, the local decoder 22 outputs a set of new predictive coefficients corresponding to the new corrected data. When the predictive coefficient memory 61 is supplied with such new predictive coefficients, the predictive coefficient memory 61 stores the new predictive coefficients instead of the already stored predictive coefficients (preceding predictive coefficients).

An error information memory 63 serves to store error information supplied from the error calculator 23. The error information memory 63 also serves to store preceding error information in addition to the present error information supplied from the error calculator 23. (Even when the error information memory 63 is supplied with the new error information is supplied, the error information memory 63 holds the already stored error information until further new error information is supplied). The error information memory 63 is cleared each time the processing for a new frame is started.

A comparing circuit 64 compares the present error information stored in the error information memory 63 with a predetermined threshold $\epsilon$, and also compares, if necessary, the present error information with the preceding error information. The result of comparison from the comparing circuit 64 is supplied to a control circuit 65.

Based on the result of comparison from the comparing circuit 64, the control circuit 65 decides whether it is appropriate (optimum) to use the corrected data stored in the corrected data memory 62 as encoded data of the original image. If the control circuit 65 recognizes (determines) that it is not optimum to use the corrected data stored in the corrected data memory 62 as encoded data of the original image, then the control circuit 65 supplies a control signal for requesting the outputting of new corrected data to the compressor 21 (correcting circuit 32) (FIG. 8). If the control circuit 65 recognizes that it is optimum to use the corrected data stored in the corrected data memory 62 as encoded data of the original image, then the control circuit 65 reads predictive coefficients stored in the predictive coefficient memory 61, outputs the predictive coefficients to the multiplexer 25, reads corrected data stored in the corrected data memory 62, and supplies the corrected data as optimum compressed data to the multiplexer 25. The control circuit 65 outputs a control signal indicating that the encoding of one frame of image data is finished to the compressor 21, enabling the compressor 21 to start processing a next frame of image data.

Operation of the decision unit 24 will be described below with reference to FIG. 17. In a step S41, the comparing circuit 64 decides whether error information is received from the error calculator 23 or not. If error information is not received from the error calculator 23, then control returns to the step S41. If error information is received from the error calculator 23, i.e., if error information is stored in the error information memory 63, then control proceeds to a step S42 in which the comparing circuit 64 compares the error information (present error information) stored in the error information memory 63 with the predetermined threshold $\epsilon$ to decide which is greater.

If the present error information is greater than the predetermined threshold $\epsilon$, then the comparing circuit 64 reads the preceding error information from the error information memory 63. The comparing circuit 64 compares the preceding error information and the present error information with each other to decide which is greater in a step S43.

When one frame of image data starts being processed and first error information is supplied, since the error information memory 63 stores no preceding error information, the decision unit 24 does not execute the step 43 and following steps. The control circuit 65 outputs a control signal to control the correcting circuit 32 (FIG. 8) for outputting a given initial address.

If the present error information is smaller than the preceding error information in the step S43, i.e., if the error information is reduced by the correction of the compressed data, then control goes to a step S44 in which the control circuit 65 outputs a control signal to change a corrective value $\Delta$ in the same manner as in the preceding cycle to the correcting circuit 32. Thereafter, control returns to the step S41. If the present error information is greater than the preceding error information in the step S43, i.e., if the error information is increased by the correction of the compressed data, then control goes to a step S45 in which the control circuit 65 outputs a control signal to change a corrective value Δ in the opposite manner to the preceding cycle to the correcting circuit 32. Thereafter, control returns to the step S41.

When the error information that has been decreasing starts to increase at a certain time, the control circuit 65 issues a control signal to change the corrective value Δ in the opposite manner to the preceding cycle at a magnitude which is ½, for example, of the magnitude so far.

The steps S41 through S45 are repeated to reduce the error information. If the present error information is smaller than the predetermined threshold $\epsilon$ in the step S42, then control goes to a step S46 in which the control circuit 65 reads predictive coefficients stored in the predictive coefficient memory 61, and also reads corrected data stored in the corrected data memory 62, and supplies the predictive coefficients and the corrected data to the multiplexer 25. Thereafter, the operation sequence comes to an end.

Figure 17:
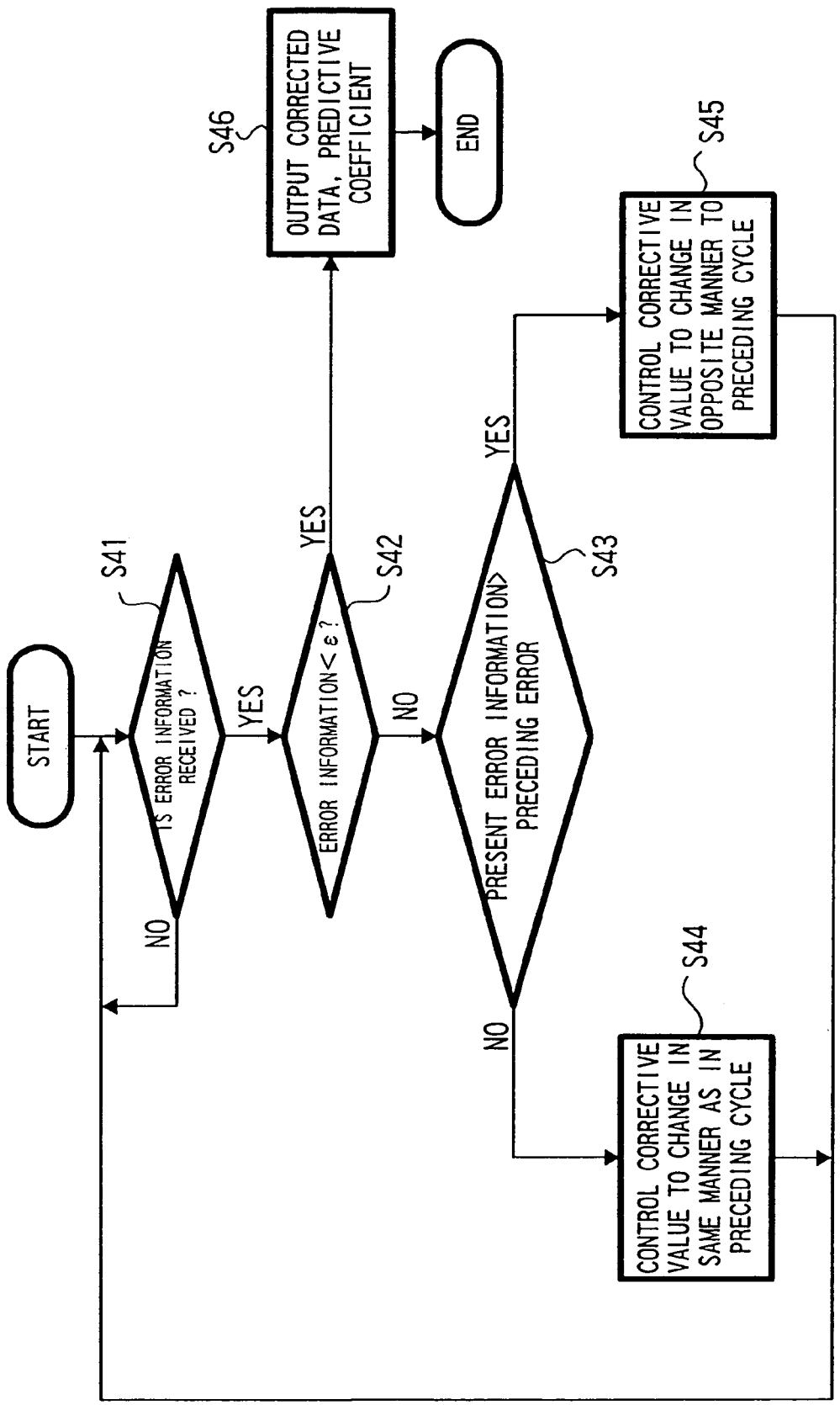
FIG. 17 is a flowchart of an operation sequence of the decision unit 24 shown in FIG. 16.

Subsequently, when error information as to a next frame is supplied, the operation sequence shown in FIG. 17 is repeated.

The correcting circuit 32 may correct either all compressed data of one frame or only some of compressed data of one frame. If the correcting circuit 32 is to correct only some of compressed data of one frame, then the control circuit 65 detects a pixel which has a strong effect on error information and correct only compressed data with respect to such a pixel. A pixel which has a strong effect on error information may be detected as follows: First, compressed data with respect to pixels that remain after decimation is processed to produce error information. The control circuit 65 outputs a control signal for correcting the compressed data with respect to pixels that remain after decimation one by one for the same corrective value Δ, to the correcting circuit 32, compares resultant error information with the error information which has been produced when the compressed data is used as is, and detects a pixel with respect to which the error information difference is greater than a predetermined value, as the pixel which has a strong effect on error information.

The correction of the compressed data is repeated until the present error information becomes smaller than the predetermined threshold $\epsilon$, and corrected data produced when the present error information becomes smaller than the predetermined threshold $\epsilon$ is outputted as an encoded data of the image data. Therefore, the receiving apparatus 4 can obtain a decoded image which is the same (substantially the same) as the original image from corrected data in which the pixel values of pixels making up an image after being decimated comprise values optimum for restoring the original image.

Inasmuch as an image is compressed by decimation and also compressed by the ADRC process and the classifying and adaptive processing process, it is possible to obtain encoded data compressed at a very high compression ratio. The above encoding process carried out in the transmitting apparatus 1 employs a coordinated combination of the decimation-based compression process and the classifying and adaptive processing process to achieve highly efficient data compression, and may thus be referred to as a coordinated encoding process.

Figure 18:
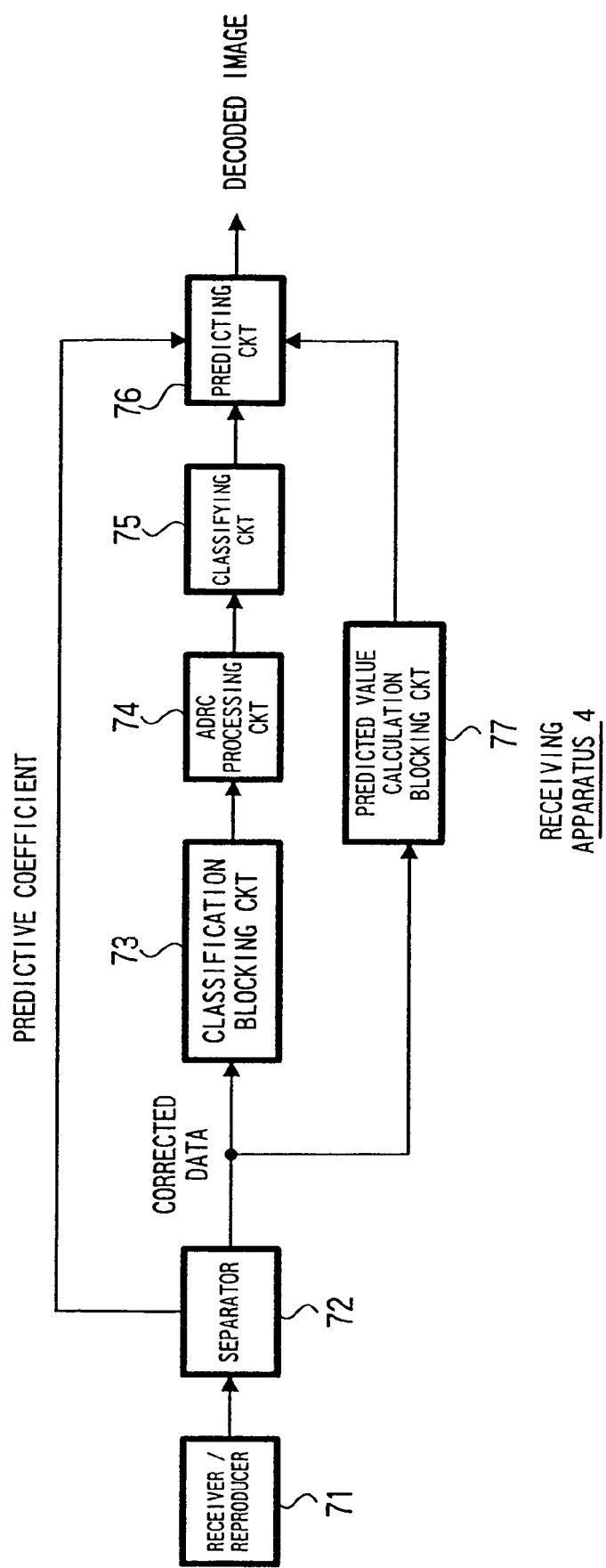
FIG. 18 is a block diagram of another arrangement for a receiving apparatus 4 shown in FIG. 1.

FIG. 18 shows another arrangement for the receiving apparatus 4 shown in FIG. 1.

A receiver/reproducer 71 reproduces encoded data recorded in the recording medium 2 or receives encoded data transmitted over the transmission path 3, and supplies the encoded data to a separator 72. The separator 72 separates the encoded data into corrected data and predictive coefficients. The corrected data is supplied to a classification blocking circuit 73 and a predicted value calculation blocking circuit 77, and the predictive coefficients are supplied to a predicting circuit 76.

The classification blocking circuit 73, an ADRC processing circuit 74, a classifying circuit 75, and the predicted value calculation blocking circuit 77 are similar respectively to the classification blocking circuit 41, the ADRC processing circuit 44, the classifying circuit 45, and the predicted value calculation blocking circuit 42 shown in FIG. 10. Therefore, these circuits effect the same operation as that of the circuits shown in FIG. 10. The predicted value calculation blocking circuit 77 outputs a predicted value calculation block, and the classifying circuit 75 outputs class information. The predicted value calculation block and the class information are supplied to the predicting circuit 76.

The predicting circuit 76 calculates a predicted value according to the equation (1) using a predictive coefficient corresponding to the class information and a predicted value calculation block supplied from the predicted value calculation blocking circuit 77. One frame of image composed of the predicted value is outputted as a decoded image. The decoded image is substantially the same as the original image, as described above.

In the reception side, the receiving apparatus 4 shown in FIG. 18 may not be used, but an apparatus for decoding a decimated image by way of simple interpolation may be used to obtain a decoded image by way of ordinary interpolation without using predictive coefficients. However, decoded images thus obtained are of degraded image quality (resolution).

In the above embodiment, the local decoder 22 shown in FIG. 6 determines a predictive coefficient and calculates a predicted value using the predictive coefficient. However, the local decoder 22 may be arranged to calculate a predicted value without determining a predictive coefficient.

Figure 19:
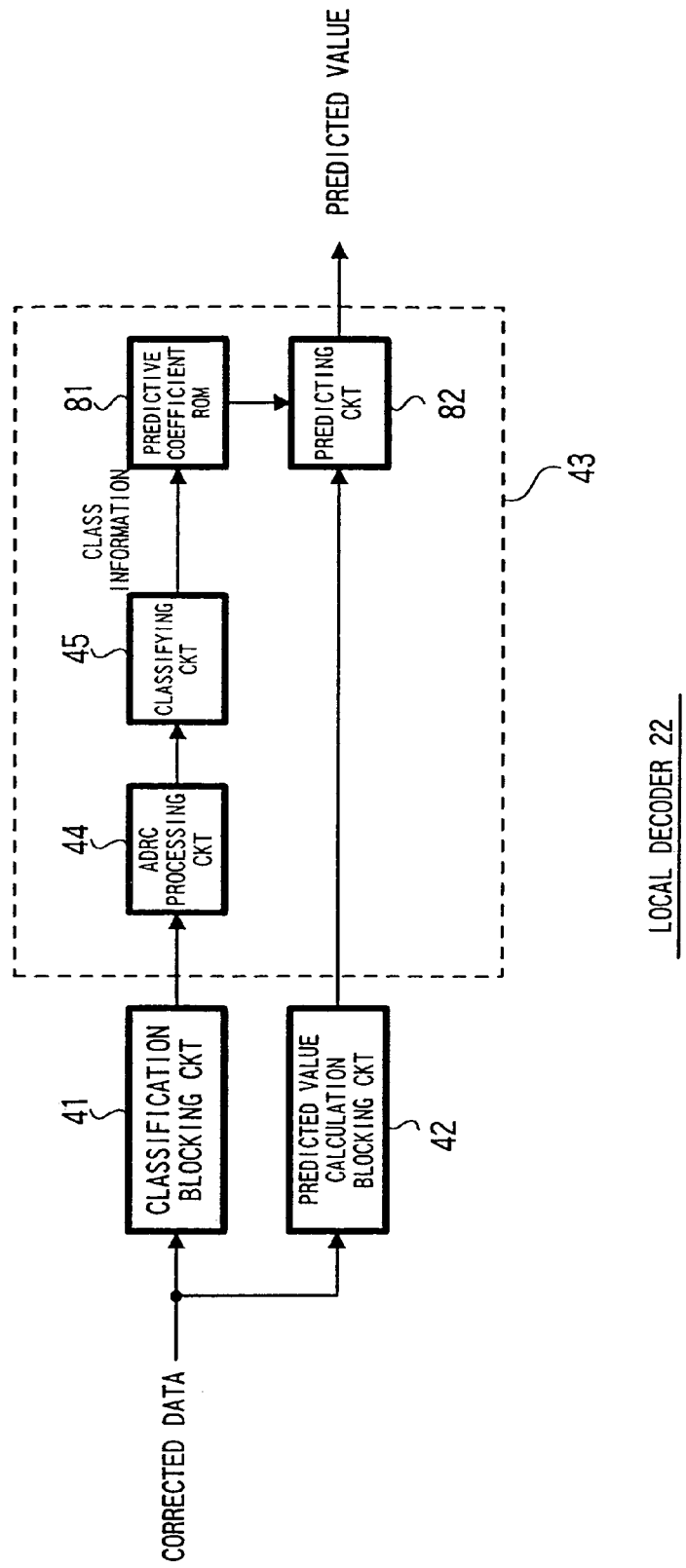
FIG. 19 is a block diagram of another arrangement for the local decoder 22 shown in FIG. 6.

FIG. 19 shows an another arrangement for the local decoder 22 shown in FIG. 6. Those parts of the local decoder shown in FIG. 19 which are identical to those shown in FIG. 10 are denoted by identical reference numerals. The local decoder shown in FIG. 19 are similar to the local decoder shown in FIG. 10 except that a predictive coefficient ROM 81 and a predicting circuit 82 are added in place of the adaptive processing circuit 46.

The predictive coefficient ROM 81 stores predictive coefficients for respective classes that have been determined by a learning process (described later on). When the predictive coefficient ROM 81 receives class information outputted from the classifying circuit 45, the predictive coefficient ROM 81 reads a predictive coefficient stored at an address corresponding to the class information, and supplies the predictive coefficient to the predicting circuit 82.

The predicting circuit 82 calculates a linear equation indicated by the equation (1) (specifically the equation (8), for example) using a predicted value calculation block supplied from the predicted value calculation blocking circuit 42 and a predictive coefficient from the predictive coefficient ROM 81, for thereby determining a predicted value of the original image.

Therefore, the classifying and adaptive processing circuit 43 shown in FIG. 19 calculates a predicted value for the original image without using the original image.

Figure 20:
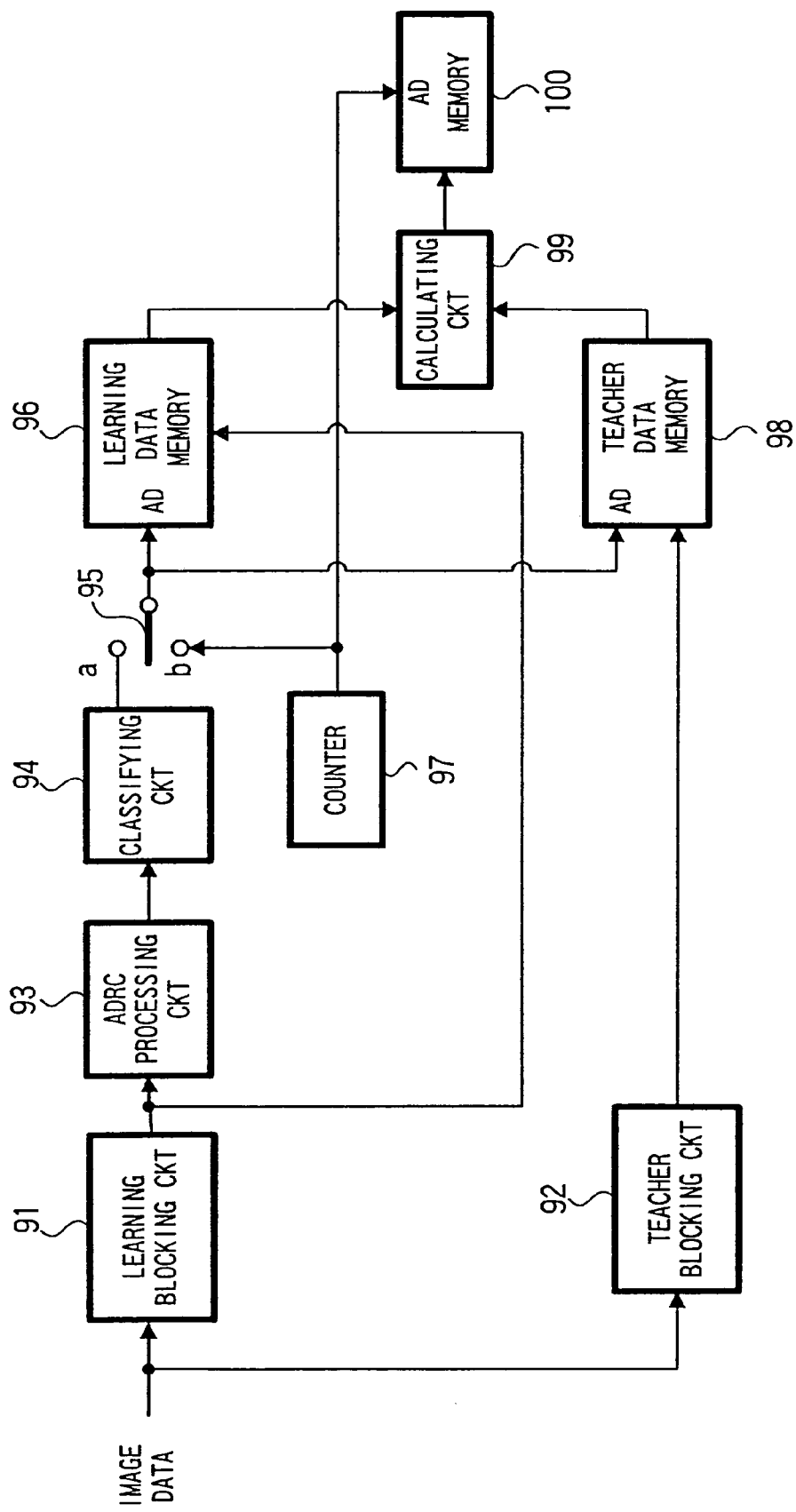
FIG. 20 is a block diagram of an image processing apparatus for calculating predictive coefficients stored in a predictive coefficient ROM 81 shown in FIG. 19.

FIG. 20 shows an image processing apparatus for carrying out a learning process to obtain a predictive coefficient stored in the predictive coefficient ROM 81 shown in FIG. 19.

A learning blocking circuit 91 and a teacher blocking circuit 92 are supplied with learning image data (leaning image) for obtaining predictive coefficients applicable to all images (the learning image data prior to being decimated). The learning blocking circuit 91 extracts four pixels (e.g., X1 through X4 shown in FIG. 2), for example, from input image data, and supplies a block composed of these four pixels as a learning block to an ADRC processing circuit 93 and a learning data memory 96.

The teacher blocking circuit 92 generates a block composed of one pixel (Y1 shown in FIG. 2) from the input image data, and supplies the block of one pixel as a teacher block to a teacher data memory 98.

When the learning blocking circuit 91 generates a learning block composed of a certain number of pixels, the teacher blocking circuit 92 generates a corresponding teacher block of a pixel.

The ADRC processing circuit 93 effects a 1-bit ADRC process on the learning block of four pixels as with the ADRC processing circuit 44 shown in FIG. 19. The block of four pixels which has been subjected to the ADRC process is supplied to a classifying circuit 94. The classifying circuit 94 classifies the block from the ADRC processing circuit 93 into a class, and class information is supplied from the classifying circuit 94 through a terminal a of a switch 95 to the learning data memory 96 and the teacher data memory 98.

The learning data memory 96 and the teacher data memory 98 store the learning block from the learning blocking circuit 91 and the teacher block from the teacher blocking circuit 92 respectively at addresses corresponding to the supplied class information.

Therefore, when a block of four pixels (X1 through X4 shown in FIG. 2) is stored as a learning block at an address in the learning data memory 96, a corresponding block of one pixel (Y1 shown in FIG. 2) is stored as a teacher block at an identical address in the teacher data memory 98.

The above process is repeated with respect to all learning images which have been prepared in advance. In this manner, a learning block, and a teacher block composed of one pixel whose predicted value is determined using a predicted value calculation block composed of four corrected data having the same positional relationship as the four pixels of the learning block by the local decoder 22 shown in FIG. 19 are stored at identical addresses in the learning data memory 96 and the teacher data memory 98.

The learning data memory 96 and the teacher data memory 98 are arranged such that a plurality of items of information can be stored at the same address and hence a plurality of learning blocks and teacher blocks can be stored at the same address.

When learning blocks and teacher blocks with respect to all learning images are stored in the learning data memory 96 and the teacher data memory 98, the switch 95 is shifted from the terminal a to a terminal b for thereby supplying an output count from a counter 97 as an address to the learning data memory 96 and the teacher data memory 98. The counter 97 counts clock pulses and outputs its count. The learning data memory 96 and the teacher data memory 98 reads learning blocks and teacher blocks stored at an address corresponding to the count, and supply the learning block and the teacher block to a calculating circuit 99.

The calculating circuit 99 is supplied with a set of learning blocks and a set of teacher blocks of a class corresponding to the count from the counter 97.

When the calculating circuit 99 receives a set of learning blocks and a set of teacher blocks of a certain class, the calculating circuit 99 calculates predictive coefficients to minimize an error according to the method of least squares, using the received learning and teacher blocks.

If it is assumed that the pixel values of pixels making up a learning block are represented by $x1, x2, x3, \ldots$ and predictive coefficients to be determined are represented by $w1, w2, w3, \ldots$, then in order to determine a pixel value y of a certain pixel which makes up the teacher block by way of a linear coupling thereof, the predictive coefficients $w1, w2, w3, \ldots$ need to satisfy the following equation:

$$y = w1x1 + w2x2 + w3x3 + \ldots$$

The calculating circuit 99 determines the predictive coefficients $w1, w2, w3, \ldots$ which minimize a square error of the predicted value $w1x1+w2x2+w3x3+\ldots$ with respect to a true value y from the learning blocks of the same class and the corresponding teacher blocks, by solving the normal equations (7).

The predictive coefficients for the respective classes which have been determined by the calculating circuit 99 are supplied to a memory 100. The memory 100 is supplied with the predictive coefficients from the calculating circuit 99 and also with counts from the counter 97. The memory 100 stores the predictive coefficients from the calculating circuit 99 at addresses corresponding to the counts from counter 97.

In this manner, the memory 100 stores predictive coefficients optimum for predicting pixels of blocks of classes at addresses corresponding to the classes.

The predictive coefficient ROM 81 shown in FIG. 19 stores the predictive coefficients which are thus stored in the memory 100.

The predictive coefficient ROM 81 may not store predictive coefficients at addresses corresponding to the classes, but may store average values of pixel values making up teacher blocks. In such a modification, when class information is given, the predictive coefficient ROM 81 outputs pixel values corresponding to the class. Therefore, the predicted value calculation blocking circuit 42 and the predicting circuit 82 in the local decoder 22 shown in FIG. 19 may be dispensed with.

If the local decoder 22 is constructed as shown in FIG. 19, stages following the receiver/reproducer 71 in the receiving apparatus 4 shown in FIG. 18 may be of an arrangement identical to the classifying and adaptive processing circuit 43 shown in FIG. 19.

In this embodiment, the sum of square errors is used as error information. However, error information may instead comprise the sum of absolute values of errors or the sum of at least cubes of errors. It is possible to determine which error information is to be used depending on its converging capability.

In this embodiment, the correction of compressed data is repeated until the error information becomes the predetermined threshold $\epsilon$. However, an upper limit may be set up for the number of times that the compressed data can be corrected. Specifically, if an image is transmitted on a real-time basis, for example, it is necessary to finish the processing of one frame within a predetermined time. However, error information may not necessarily be converged within the predetermined time. With an upper limit set up for the number of times that the compressed data can be corrected, if the error information is not converged to a level smaller than the predetermined threshold $\epsilon$, the processing of the frame is finished (the corrected data produced at the time is regarded as encoded data, and the processing of a next frame may be started.

In this embodiment, a block is composed of one frame of image. However, a block may be composed of pixels at the same position in a plurality of frames that are successive in time.

In this embodiment, the compressor 21 simply decimates an image, i.e., extracts every other pixel from the image, thereby producing compressed data. However, the compressor 21 may determine an average value of pixels making up a block and reduce the number of pixels (decimate pixels) by using the average value as the pixel value of a central pixel of the block, thereby producing compressed data.

Figure 21:
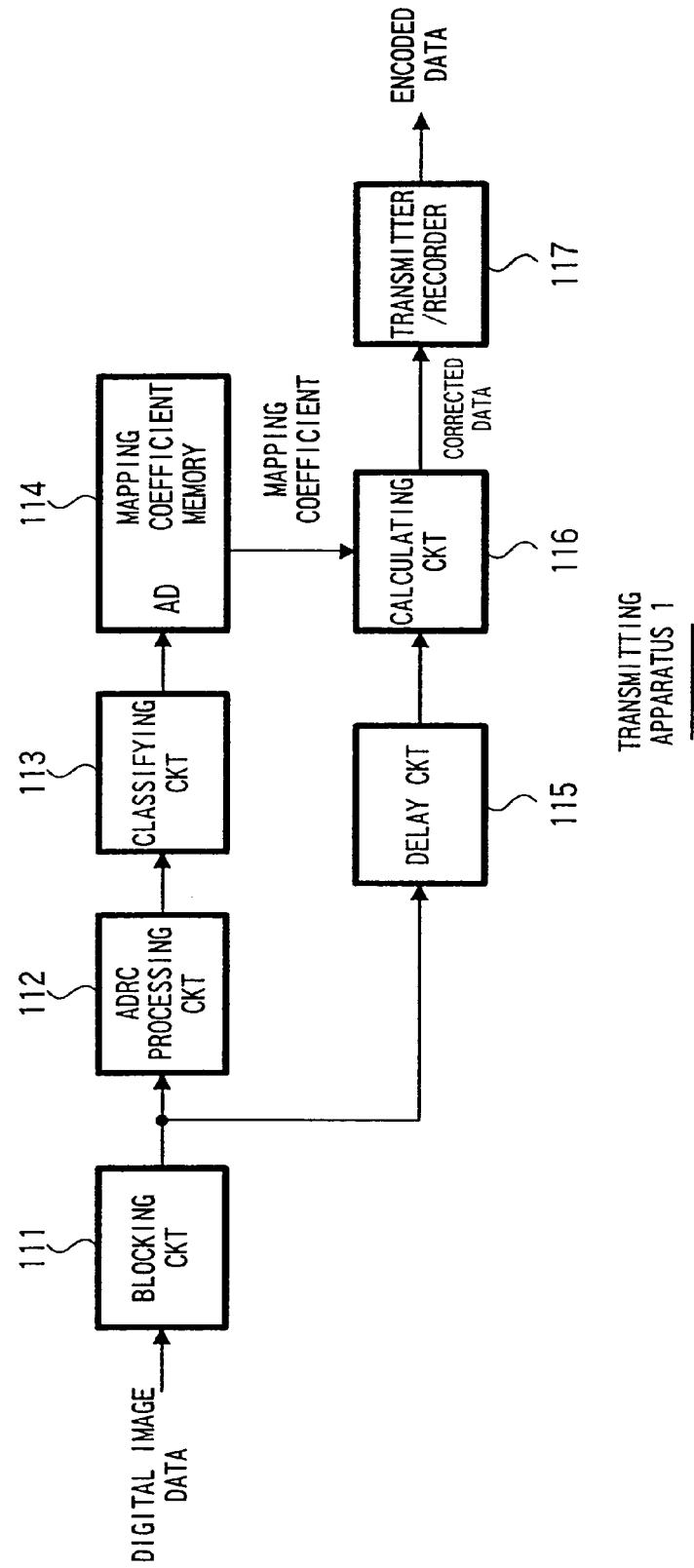
FIG. 21 is a block diagram of still another arrangement for the transmitting apparatus 1 shown in FIG. 1.

FIG. 21 shows an arrangement for the transmitting apparatus 1 in such a modification.

A blocking circuit 111 is supplied with image data to be encoded, converts the image into a classification block which a unit for classifying the image data into a given class depending on the nature thereof, and supplies the classification block to an ADRC processing circuit 112 and a delay circuit 115.

The ADRC processing circuit 112 effects an ADRC process on the block (classification block) from the blocking circuit 111, and supplies a block composed of an ADRC code produced by the ADRC process to a classifying circuit 113.

The ADRC process reduces the number of bits of pixels which make up the classification block.

The classifying circuit 113 classifies the block from the ADRC processing circuit 112 into a class depending on the nature thereof, and supplies class information indicative of which class the block belongs to to a mapping coefficient memory 114.

The mapping coefficient memory 114 stores mapping coefficients obtained by a learning process (mapping coefficient learning process), described later on, with respect to respective items of class information. The mapping coefficient memory 114 reads a mapping coefficient stored at an address represented by class information supplied from the classifying circuit 113, and supplies the mapping coefficient to a calculating circuit 116.

The calculating circuit 116 effects a predetermined calculation using the pixel values of pixels making up the block supplied from the delay circuit 115 and a mapping coefficient corresponding to the class of the block, supplied from the mapping coefficient memory 114, for thereby calculating encoded data indicative of an image from which a number of pixels are decimated (reduced). Specifically, if it is assumed that the pixel values of pixels making up a block (the pixel values of an original image) outputted from the blocking circuit 111 are represented by y1, y2, . . . , and mapping coefficients corresponding to the class of the block, outputted from the mapping coefficient memory 114, are represented by k1, k2, . . . , then the calculating circuit 116 calculates a predetermined function value f (y1, y2, . . . , k1, k2, . . . ) with those pixel values and mapping coefficients as arguments, and outputs the function value f (y1, y2, . . . , k1, k2, . . . ) as the pixel value of a central pixel among pixels which make up the block (classification block) outputted from the blocking circuit 111.

Therefore, if the number of pixels which make up the classification block outputted from the blocking circuit 111 is N, then the calculating circuit 116 decimates the image to 1/N and outputs the decimated data as encoded data.

The encoded data outputted from the calculating circuit 116 is not produced by a simple decimating process in which a central pixel is selected from a block composed of N pixels and outputted. Rather, the encoded data outputted from the calculating circuit 116 represents a function value f (y1, y2, . . . , k1, k2, . . . ) defined by N pixels making up the block. Stated otherwise, the function value f (y1, y2, . . . , k1, k2, . . . ) may be considered as representing the correction of the pixel value of the central pixel of the block, which is produced by a simple decimating process, based on surrounding pixel values. The encoded data which are produced as a result of calculating the mapping coefficients and the pixels making up the block will hereinafter be referred to as "corrected data".

The calculating process effected by the calculating circuit 116 may be considered as a process of mapping the pixel values of pixels making up the classification block outputted from the blocking circuit 111 onto the function value f (y1, y2, . . . , k1, k2, . . . ). Therefore, the coefficients k1, k2, . . . used in such a process are called mapping coefficients.

A transmitter/recorder 117 serves to record the corrected data supplied as encoded data from the calculating circuit 116 on the recording medium 2 or transmit the corrected data over the transmission path 3.

Figure 22:
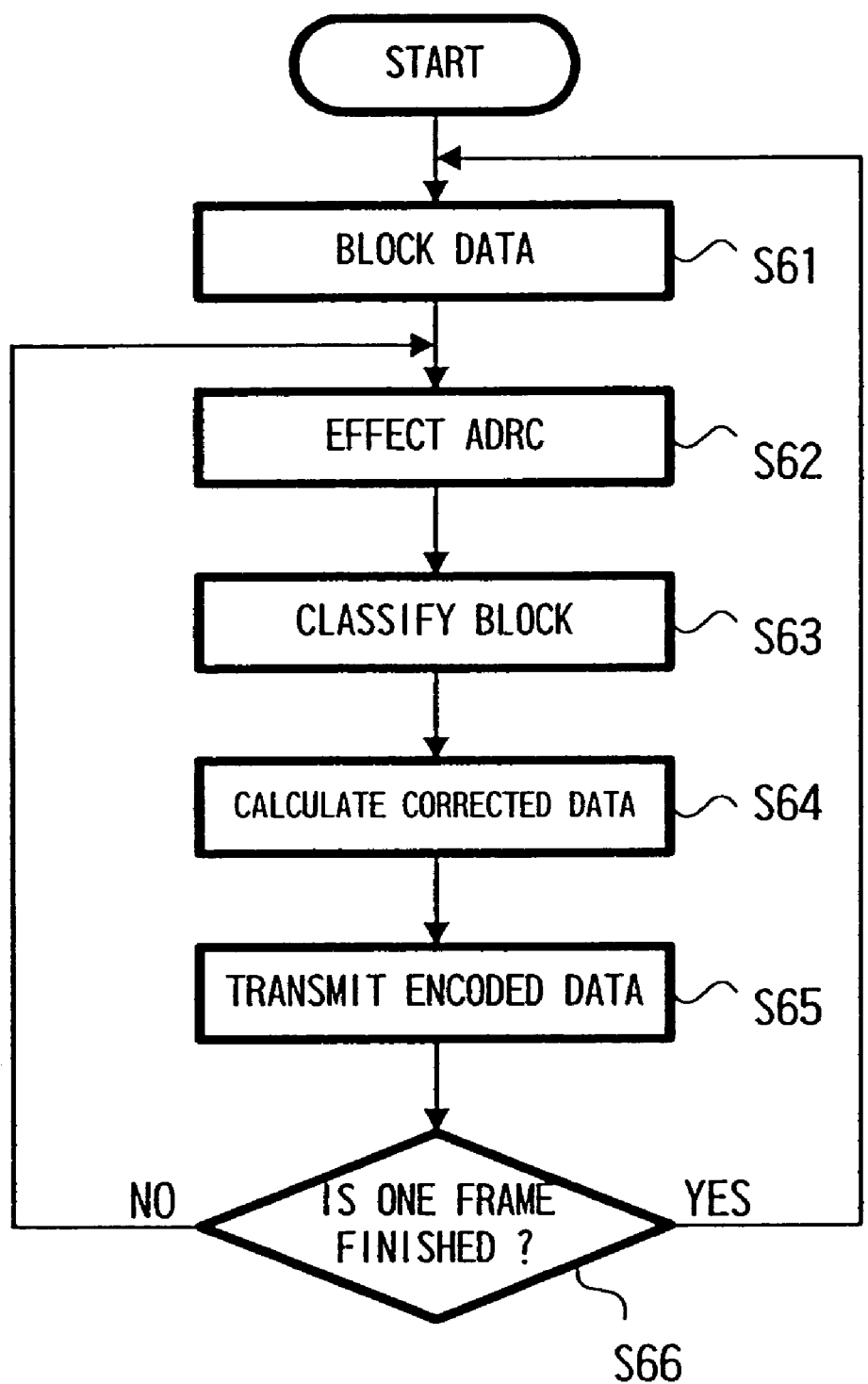
FIG. 22 is a flowchart of an operation sequence of the transmitting apparatus shown in FIG. 21.

Operation of the transmitting apparatus 1 shown in FIG. 21 will be described below with reference to FIG. 22.

The blocking circuit 111 is supplied with one frame (field) of image data. The blocking circuit 111 converts one frame of image data into a block in a step S61. Specifically, the blocking circuit 111 converts one frame of image data into a classification block made up of five pixels, and supplies the classification block to the ADRC processing circuit 112 and the delay circuit 115.

The classification block comprises a crisscross block of five pixels. However, the classification block may be of any of arbitrary shapes including a rectangular shape, a square shape, etc. Furthermore, the number of pixels that make up a classification block is not limited to five. Furthermore, the classification block may not be composed of adjacent pixels, but may be composed of spaced-apart pixels. However, the shape of a classification block and the number of pixels making up the classification block need to be the same as those in a learning process (mapping coefficient learning process).

When the ADRC processing circuit 112 receives the classification block from the blocking circuit 111, the ADRC processing circuit 112 effects a 1-bit ADRC process, for example, on four pixels (X1 through X4 shown in FIG. 2), except a central pixel (Y1 shown in FIG. 2), of the classification block in a step S62, for thereby producing a block composed of R, G, B pixels each represented by 1 bit. The classification block subjected to the ADRC process is supplied to the classifying circuit 113.

The classifying circuit 113 classifies the classification block from the ADRC processing circuit 112 into a class, and supplies class information as an address to the mapping coefficient memory 114. The mapping coefficient memory 114 reads mapping coefficients corresponding to the class information supplied from the classifying circuit 113, and supplies the mapping coefficients to the calculating circuit 116.

The delay circuit 115 delays the five-pixel data of the classification block from the blocking circuit 111, and supplies the delayed five-pixel data to the calculating circuit 116 after the mapping coefficients corresponding to the class information of the block are read from the mapping coefficient memory 114. The calculating circuit 116 calculates the function value f(•) ("•" in the parentheses of the function f represents a set of pixel values X1, X2, and mapping coefficients k1, k2, . . . ) using the pixel values of the pixels of the classification block from the delay circuit 115 and the mapping coefficients from the mapping coefficient memory 114, for thereby determining corrected data in which the pixel value of the central pixel of the classification block is corrected, in a step S64. In this case, one item of pixel data in the position of pixel data Y1 (X5) is generated from the pixel data X1 through X4 and the pixel data Y1(X5) shown in FIG. 2. The conversion of the image data into a block is carried out overlappingly on the pixel data until finally ½ of pixel data is decimated. In this process, in order to generate an R component (a G component or a B component), not only the R component (the G component or the B component) but also the G component and the B component (the R component and the B component or the R component or the G component G) are employed. The corrected data is supplied as encoded data indicative of an encoded image to the transmitter/recorder 117.

The transmitter/recorder 117 records the encoded data from the calculating circuit 116 on the recording medium 2 or transmits the encoded data over the transmission path 3 in a step S65.

Control then proceeds to a step S66 which decides whether the processing with respect to one frame of image data is finished or not. If the processing with respect to one frame of image data is not finished, then control returns to the step S62, and the step 62 and following steps are repeated with respect to a next classification block. If the processing with respect to one frame of image data is finished, then control returns to the step S61, and the step 61 and following steps are repeated with respect to a next frame.

Figure 23:
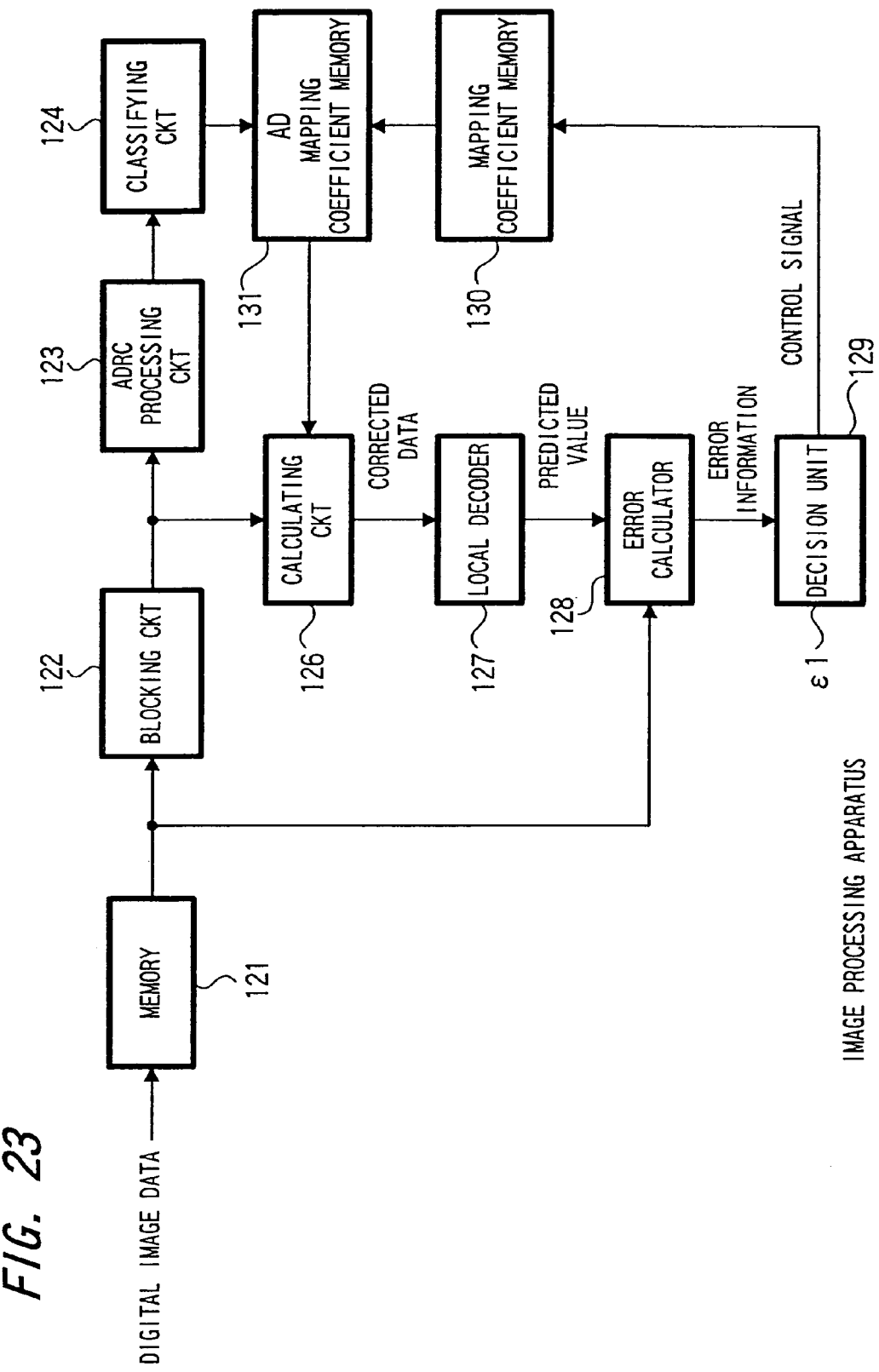
FIG. 23 is a block diagram of an image processing apparatus according to a first embodiment for carrying out a learning process for obtaining a mapping coefficient.

FIG. 23 shows an image processing apparatus for carrying out a learning process (mapping coefficient learning process) for obtaining a mapping coefficient stored in the mapping coefficient memory 114 shown in FIG. 21.

A memory 121 stores at least one frame of digital image data suitable for being learned (hereinafter referred to as "learning image"). A blocking circuit 122 reads image data stored in the memory 121, generates a block which is the same as the classification block outputted from the blocking circuit 111 shown in FIG. 21, and supplies the block to an ADRC processing circuit 123 and a calculating circuit 126.

The ADRC processing circuit 123 and a classifying circuit 124 operate in the same manner as the ADRC processing circuit 112 and the classifying circuit 113 shown in FIG. 21. Therefore, the classifying circuit 124 outputs class information of the block outputted from the blocking circuit 122. The class information is supplied as an address to a mapping coefficient memory 131.

The calculating circuit 126 effects the same calculation as the calculating circuit 116 shown in FIG. 21, using the pixels making up the block supplied from the blocking circuit 122 and mapping coefficients supplied from the mapping coefficient memory 131, and supplies resultant corrected data (function value f(•)) to a local decoder 127.

Based on the corrected data supplied from the calculating circuit 126, the local decoder 127 predicts (calculates) a predicted value for the original image (a predicted value for the pixel values of pixels making up the block outputted from the blocking circuit 122), and supplies the predicted value to an error calculator 128. The error calculator 128 reads, from the memory 121, pixel values of a learning image corresponding to the predicted value supplied from the local decoder 127, calculates (detects) a predicted error for the predicted value with respect to the pixel values of the learning image, and supplies the predicted error as error information to a decision unit 129.

The decision unit 129 compares the error information from the error calculator 128 with a predetermined threshold $\epsilon 1$, and controls a mapping coefficient setting circuit 130 based on a result of comparison. Under the control of the decision unit 129, the mapping coefficient setting circuit 130 sets up (changes) a set of as many mapping coefficients as the number of classes obtained by the classification process in the classifying circuit 124, and supplies the set of mapping coefficients to the mapping coefficient memory 131.

The mapping coefficient memory 131 temporarily stores mapping coefficients supplied from the mapping coefficient setting circuit 130. The mapping coefficient memory 131 has storage areas capable of storing as many mapping coefficients (set of mapping coefficients) as the number of classes obtained by the classification process in the classifying circuit 124. When supplied with new mapping coefficients from the mapping coefficient setting circuit 130, the storage areas store the new mapping coefficients in place of mapping coefficients which have already been stored therein.

The mapping coefficient memory 131 reads mapping coefficients stored at an address corresponding to the class information supplied from the classifying circuit 124, and supplies the mapping coefficients to the calculating circuit 126.

Operation of the image processing apparatus shown in FIG. 23 will be described below with reference to FIG. 24.

First, the mapping coefficient setting circuit 130 sets up a set of as many initial mapping coefficients as the number of classes produced in the classifying circuit 124, and supplies the initial mapping coefficients to the mapping coefficient memory 131 in a step S71. The mapping coefficient memory 131 stores the mapping coefficients (initial values) from the mapping coefficient setting circuit 130 at addresses of the corresponding classes.

The blocking circuit 122 converts all learning images stored in the memory 121 into a block of five pixels (X1 through X4, Y1 shown in FIG. 2) in the same manner as the blocking circuit 111 shown in FIG. 21 in a step S72. The blocking circuit 122 reads the block from the memory 121 and supplies the block to the ADRC processing circuit 123 and the calculating circuit 126.

The ADRC processing circuit 123 effects a 1-bit ADRC process on four pixels (X1 through X4 shown in FIG. 2) of the block from the blocking circuit 122, in the same manner as the ADRC processing circuit 112 shown in FIG. 21, and supplies the block to the classifying circuit 124 in a step S73. The classifying circuit 124 determines the class of the block supplied from the ADRC processing-circuit 123, and supplies class information of the class as an address to the mapping coefficient memory 131 in a step S74. In a step S75, the mapping coefficient memory 131 reads mapping coefficients from an address corresponding to the class information supplied from the classifying circuit 124, and supplies the mapping coefficients to the calculating circuit 126 in a step S75.

When the calculating circuit 126 receives the five pixels (X1 through X4, Y1 shown in FIG. 2) of the block from the blocking circuit 122 and also receives the mapping coefficients corresponding to the class of the block from the mapping coefficient memory 131, the calculating circuit 126 calculates the above function value f(•) using the mapping coefficients and the pixel values of the five pixels of the block supplied from the blocking circuit 122 in a step S76. The calculated result is supplied as corrected data in which the pixel value of the central pixel of the block supplied from the blocking circuit 122 is corrected, to the local decoder 127.

If the block of X1 through X4, Y1, for example, shown in FIG. 2 is outputted from the blocking circuit 122, then the calculating circuit 126 determines corrected data in which the pixel value is corrected, and outputs the corrected data to the local decoder 127.

In the calculating circuit 126, the conversion of the image data into a block in the blocking circuit 122 is carried out overlappingly on the pixel data until finally the number of pixels of a learning image is reduced to ½. Then, the corrected data is supplied to the local decoder 127.

Figure 24:
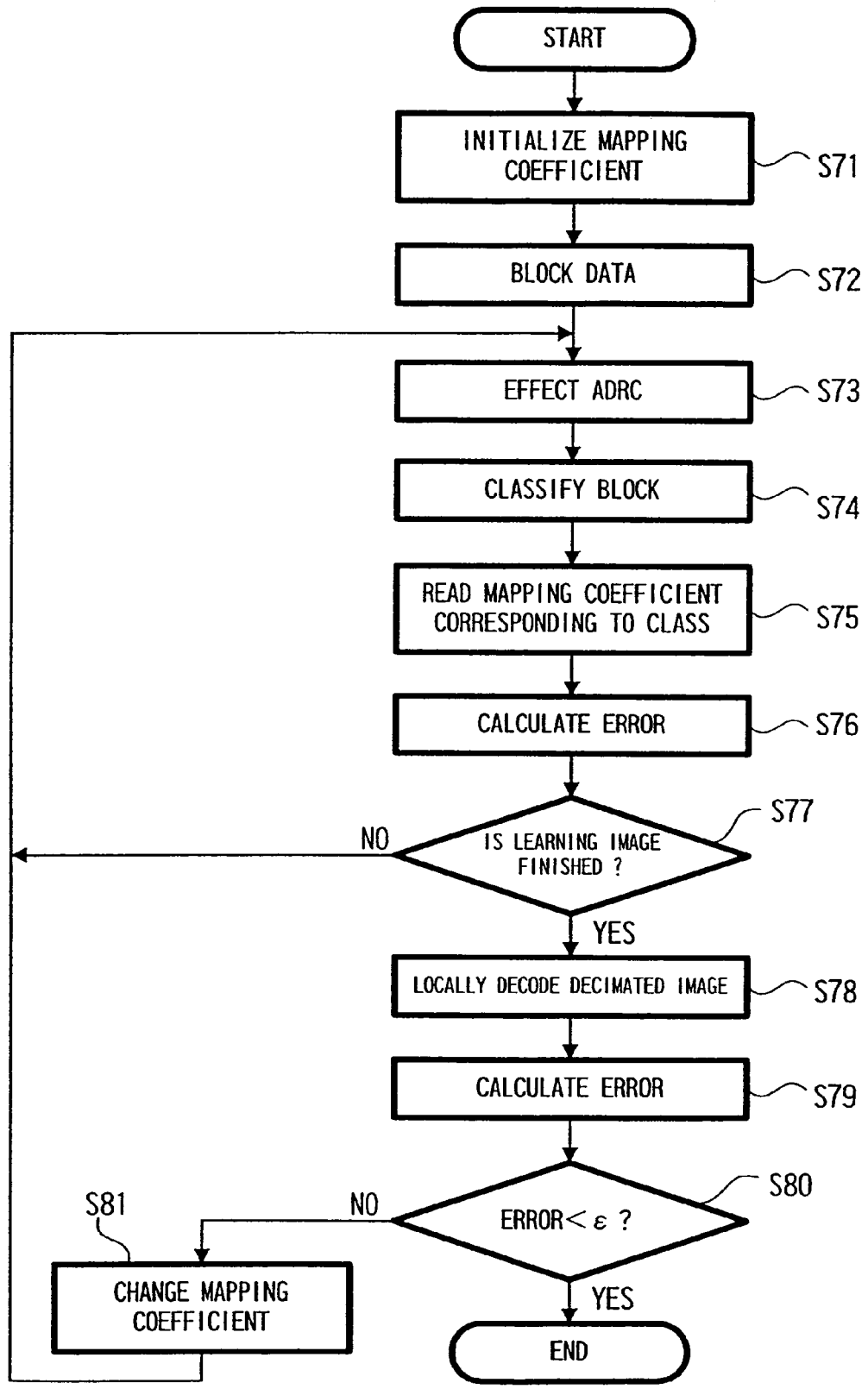
FIG. 24 is a flowchart of an operation sequence of the image processing apparatus shown in FIG. 23.

In FIG. 24, after the corrected data is calculated in the step S76, control proceeds to a step S77 which decides whether corrected data with respect to all learning images stored in the memory 121 has been determined or not. If corrected data with respect to all learning images has not been determined, then control goes back to the step S73, and the steps S73 through S77 are repeated until corrected data with respect to all learning images is determined.

If corrected data with respect to all learning images has been determined, i.e., if images from which pixels are decimated to ½ are produced from all learning images stored in the memory 121 (the decimated images are not generated by simply decimating pixels to ½, but by determining pixel values based on calculations with respect to mapping coefficients), then control proceeds to a step S78 in which the local decoder 127 locally decodes the decimated images to calculate a predicted value for the original image. The predicted value is supplied to the error calculator 128.

An image composed of the predicted value produced by the local decoder 127 (as described later on, when the error information outputted from the error calculator 128 becomes smaller than the threshold ε1) is the same as a decoded image produced by the receiving apparatus 4.

The error calculator 128 reads a learning image from the memory 121, and calculates a predicted error for the predicted value supplied from the local decoder 127 in a step S79. Specifically, if it is assumed that a pixel value of a learning image is represented by Yij and a predicted value therefor outputted from the local decoder 127 is represented by E[Yij], then the error calculator 128 calculates an error variance (sum of squared errors) Q indicated by the following equation, and supplies the error variance Q as error information to the decision unit 129.

$$Q = \Sigma(Yij - E[Yij])2$$

where Σ represents summation of all pixels of the learning image.

When the decision unit 129 receives the error information from the error calculator 128, the decision unit 129 compares the error information with the predetermined threshold ε1 to determine which is greater in a step S80. If the error information is greater than the predetermined threshold ε1, i.e., if the image composed of the predicted value produced by the local decoder 127 is not the same as the original learning image, then the decision unit 129 outputs a control signal to the mapping coefficient setting circuit 130. The mapping coefficient setting circuit 130 changes mapping coefficients according to the control signal from the decision unit 129, and newly stores the changed mapping coefficients in the mapping coefficient memory 131 in a step S81.

Then, control goes back to the step S73, and the step 73 and following steps are repeated using the changed mapping coefficients stored in the mapping coefficient memory 131.

The mapping coefficient setting circuit 130 may randomly change mapping coefficients, or may change them in the same tendency as in the preceding cycle if the present error information is smaller than the preceding error information and in the opposite tendency to the preceding cycle if the present error information is greater than the preceding error information.

Mapping coefficients may be changed with respect to all classes, or some classes. If mapping coefficients are to be changed with respect to some classes, then a class which has a strong effect on error information, for example, may be detected, and only mapping coefficients with respect to the class may be changed. A class which has a strong effect on error information can be detected as follows: First, image data is processed using initial mapping coefficients to produce error information. The mapping coefficients are changed by the same amount with respect to each class, and resultant error information is compared with the error information produced when the image data is processed using the initial mapping coefficients. A class with respect to which the error information difference is greater than a predetermined value is detected as the class which has a strong effect on error information.

If a plurality of mapping coefficients, e.g., k1, k2, ..., are handled as a set, only those which have a strong effect on error information may be changed.

Although mapping coefficients are set up with respect to each class, mapping coefficients may be set up independently with respect to each class, or set up with respect to a unit of close blocks.

If mapping coefficients are set up independently with respect to each class, then a plurality of sets of mapping coefficients may possibly be obtained with respect to a certain class (or conversely, there may be a class with respect to which no set of mapping coefficients is set up). Since mapping coefficients need to be finally determined with respect to each class, if a plurality of sets of mapping coefficients are obtained with respect to a certain class, it is necessary to process the mapping coefficients of these sets in some way to determine a set of mapping coefficients.

If the error information is smaller than the threshold ε1 in the step S80, i.e., if the image composed of the predicted value produced by the local decoder 127 is the same as the original learning image, then the operation sequence is finished.

At this time, the mapping coefficients with respect to the classes, stored in the mapping coefficient memory 131, are set in the mapping coefficient memory 114 shown in FIG. 21 as being optimum for obtaining corrected data capable of restoring a decoded image (predicted value) that is considered to be identical to the original image.

By generating corrected image using such mapping coefficients, the receiving apparatus 4 can obtain an image which is substantially the same as the original image.

In the embodiment shown in FIG. 23, an image is converted into a block of four pixels by the blocking circuit 122, and a 1-bit ADRC process is effected on the block by the blocking circuit 122. The number of classes produced by the classifying circuit 124 is 4096, and hence 4096 sets of mapping coefficients are produced.

Figure 25:
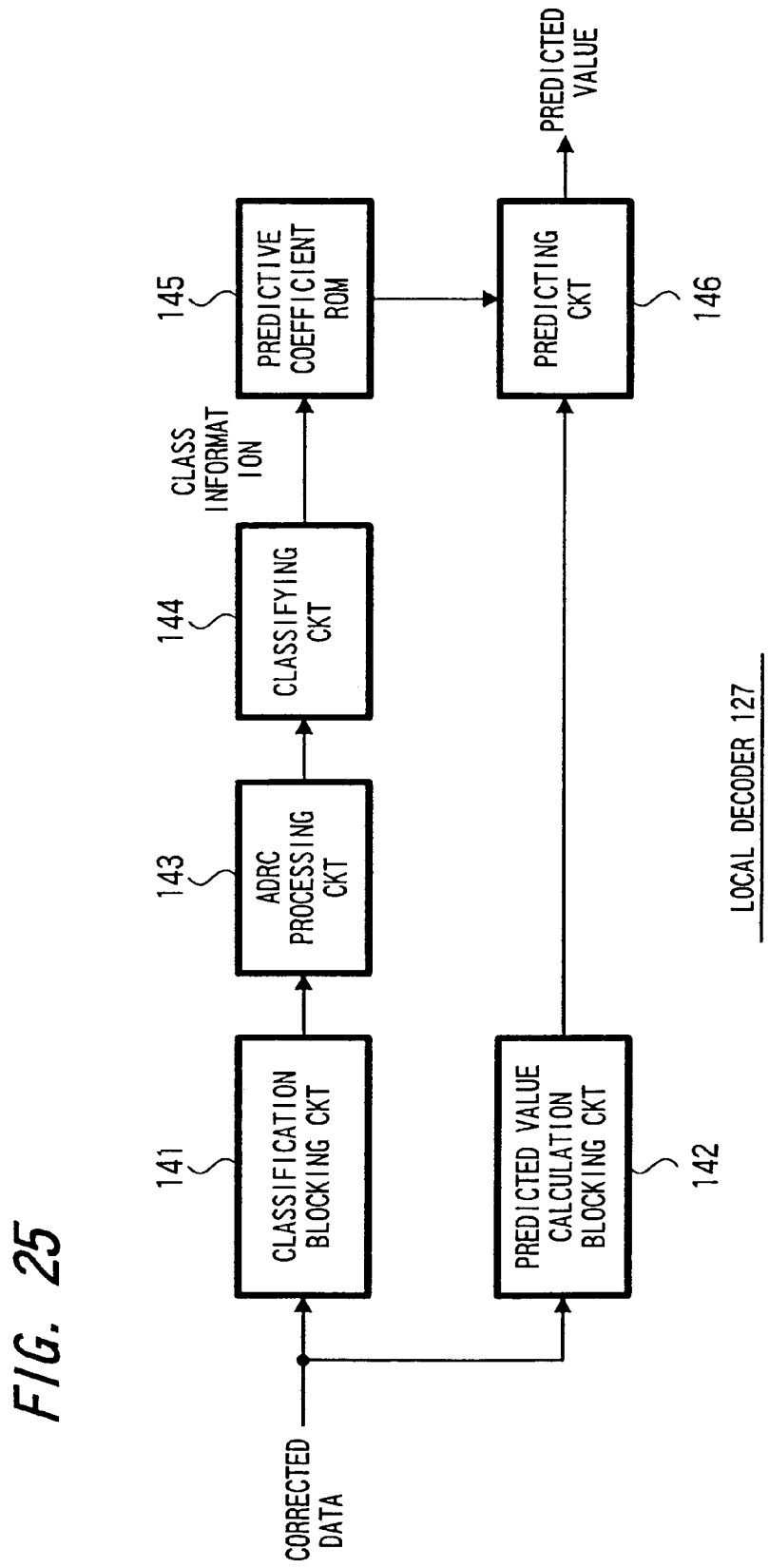
FIG. 25 is a block diagram of a local decoder 127 shown in FIG. 23.

FIG. 25 shows an arrangement for the local decoder 127 shown in FIG. 23.

Corrected data from the calculating circuit 126 is supplied to a classification blocking circuit 141 and a predicted value calculation blocking circuit 142. The classification blocking circuit 141 converts the corrected data into a classification block which is a unit for classifying the corrected data into a given class depending on the nature thereof.

A classification block produced by the classification blocking circuit 141 shown in FIG. 25 is arranged to determine the class of a block for determining a predicted value, and differs from a block which is generated by the blocking circuit 111 shown in FIG. 21 for determining the class of a block for calculating corrected data.

The predicted value calculation blocking circuit 142 converts the corrected data into a predicted value calculation block which is a unit for calculating a predicted value for an original image (learning image).

The predicted value calculation block produced by the predicted value calculation blocking circuit 142 is supplied to a predicting circuit 146.

As with the classification block, the number of pixels and the shape of the predicted value calculation block are not limited to those described above. It is, however, preferable to make the number of pixels making up the predicted value calculation block greater than the number of pixels making up the classification block in the local decoder 127.

In the above blocking process (and also in other processes), corresponding pixels may not be present in the vicinity of the image frame of an image. In such a case, the processes are carried out on the assumption that pixels identical to those which make up the image frame are present outside of the image frame.

An ADRC processing circuit 143 effects a 1-bit ADRC process, for example, on the block (classification block) outputted from the classification blocking circuit 141, and supplies the block to a classifying circuit 144. The classifying circuit 144 classifies the block from the ADRC processing circuit 143 into a class, and supplies class information as a result of classification to a predictive coefficient ROM 145. The predictive coefficient ROM 145 stores predictive coefficients. When the predictive coefficient ROM 145 receives the class information from the classifying circuit 144, the predictive coefficient ROM 145 reads predictive coefficients stored at an address corresponding to the class information, and supplies the predictive coefficients to the predicting circuit 146. The predictive coefficients stored in the predictive coefficient ROM 145 have been obtained by a learning process (predictive coefficient learning process), described later on.

The predicting circuit 146 calculates (predicts) a predicted value for the original image (learning image) using the predicted value calculation block from the predicted value calculation blocking circuit 142 and the predictive coefficients read from the predictive coefficient ROM 145.

Figure 26:
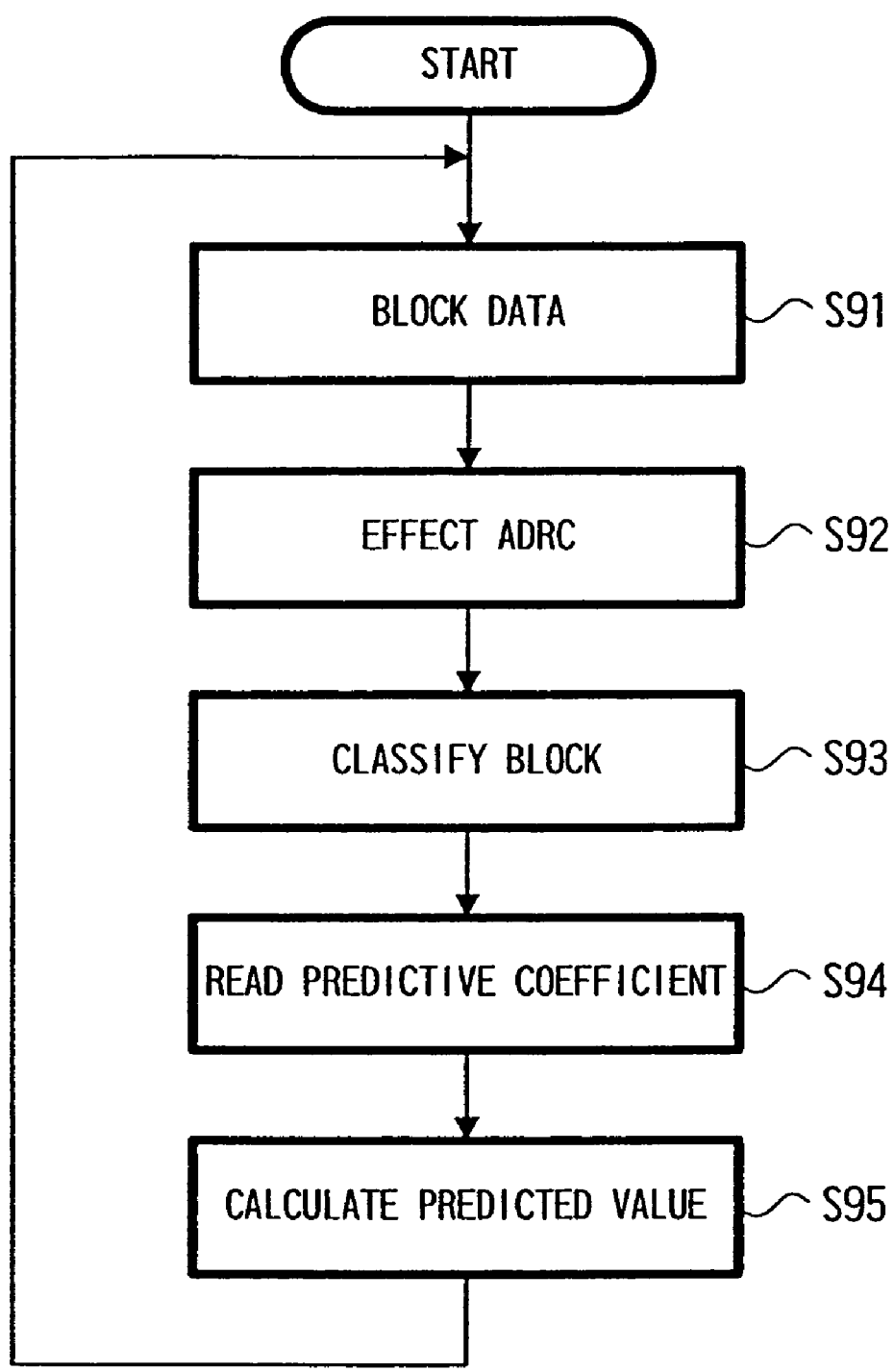
FIG. 26 is a flowchart of an operation sequence of the local decoder 127 shown in FIG. 25.

Operation of the local decoder 127 shown in FIG. 26 will be described below.

First, the local decoder 127 successively receives corrected data from the calculating circuit 126 and converts them into a block in a step S91. Specifically, the classification blocking circuit 141 converts the corrected data into a classification block of four pixels (X1 through X4 shown in FIG. 2), and supplies the block to the ADRC processing circuit 143. The predicted value calculation blocking circuit 142 converts the corrected data into a predicted value calculation block of four pixels, and supplies the predicted value calculation block to the predicting circuit 146.

The classification blocking circuit 141 and the predicted value calculation blocking circuit 142 generate a corresponding classification block and a corresponding predicted value calculation block, respectively.

When the ADRC processing circuit 143 receives the classification block, the ADRC processing circuit 143 effects a 1-bit ADRC process (ADRC for quantizing data again with 1 bit) on the classification block to convert (encode) the corrected data into a 1-bit classification block, and outputs the 1-bit classification block to the classifying circuit 144 in a step S92. The classifying circuit 144 classifies the classification block subjected to the ADRC process, and determines a class to which the classification block belongs in a step S93. The determined class is supplied as class information to the predictive coefficient ROM 145.

In this embodiment, since a classification block composed of four pixels whose R, G, B components are subjected to the 1-bit ADRC process is classified, the classification block is classified into one of 4096 (=(2$^{12}$)) classes.

Control then goes to a step S94 in which predictive coefficients are read from the predictive coefficient ROM 145 at an address corresponding to the class information from the classifying circuit 144. Using the predictive coefficients and the four pixel values of the predicted value calculation block from the predicted value calculation blocking circuit 142, the predicting circuit 146 calculates a predicted value E[y] of a pixel y of the original image according to the following linear equation in a step S95:

$$E[y] = w1 x1 + w2 x2 + \ldots$$

where w1, w2, ... represent predictive coefficients, and x1, x2, ... represent the pixel values (corrected data) of pixels making up the predicted value calculation block. The pixel values x1, x2, ... each have R, G, B components, and the predictive coefficients w1, w2, ... comprise coefficients for the R, G, B components.

In the embodiment shown in FIG. 25, as described above, a predicted value for one pixel is calculated from four pixels which make up a predicted value calculation block.

Specifically, it is assumed that class information C with respect to a classification block composed of corrected data X1 through X4 shown in FIG. 2 is outputted from the classifying circuit 144, and a predicted value calculation block composed of corrected data X1 through X4 is outputted from the predicted value calculation blocking circuit 142.

If the predictive coefficient ROM 145 stores a set of predictive coefficients w1(R) through w12(R), w1(G) through w12(G), w1(B) through w12(B) at an address corresponding to the class information, then predicted values E[YRi], E[YGi], E[YBi] of components YRi, YGi, YBi of each pixel are calculated in the same manner as described above.

After the predicted values are determined in the step S95, control returns to the step S91, and the steps 91 through S94 are repeated to determine predicted values for each unit of four pixels.

An image processing apparatus for carrying out a learning process (predictive coefficient learning process) to produce predictive coefficients stored in the predictive coefficient ROM 145 shown in FIG. 25 is identical to the image processing apparatus shown in FIG. 10, and will not be described below.

Figure 27:
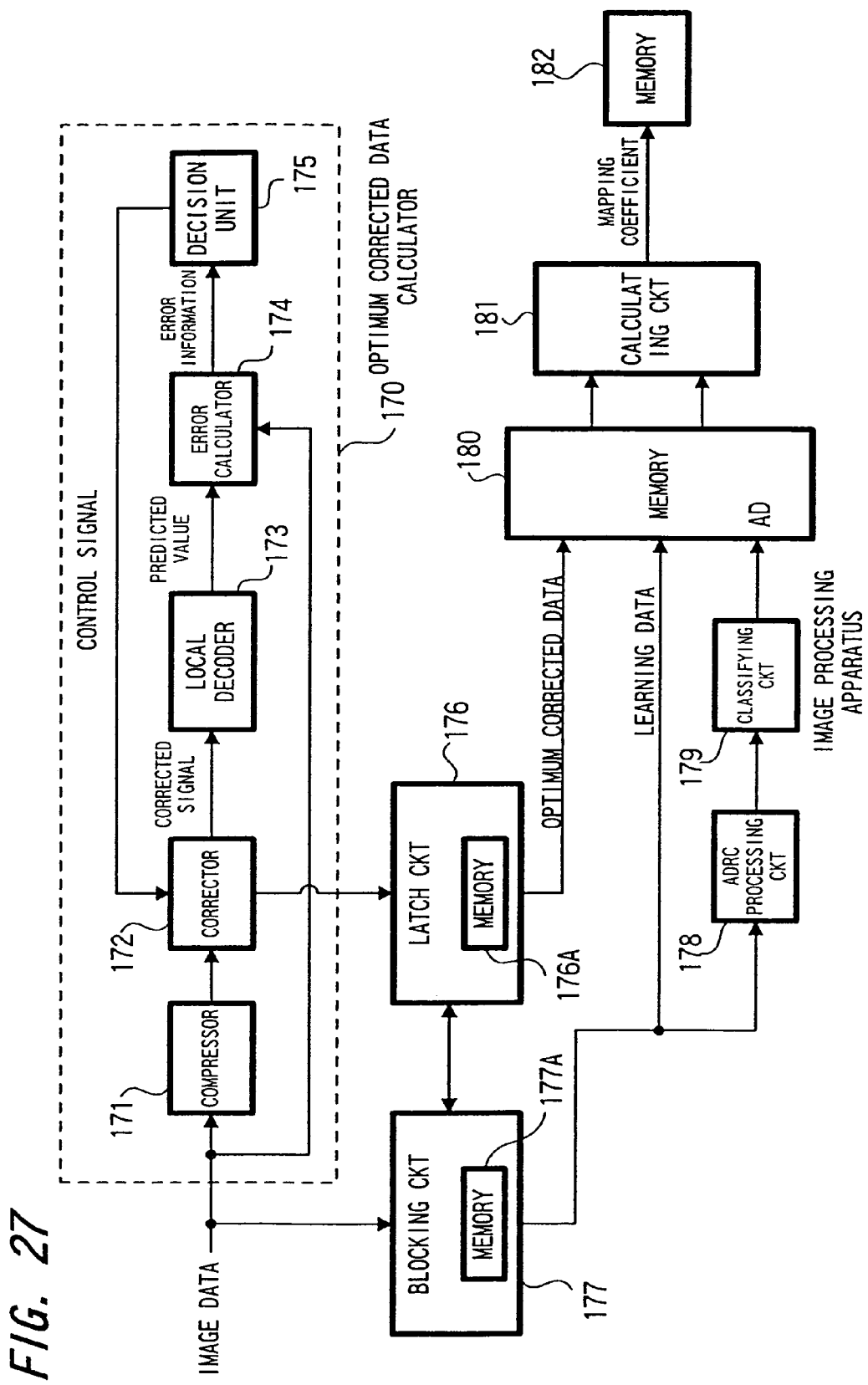
FIG. 27 is a block diagram of an image processing apparatus according to a second embodiment for carrying out a learning process for obtaining mapping coefficients.

FIG. 27 shows another image processing apparatus for carrying out a learning process (mapping coefficient learning process) for obtaining mapping coefficients stored in the mapping coefficient memory 114 shown in FIG. 21.

The image processing apparatus shown in FIG. 23 can determine optimum predictive coefficients when the function f is represented by a linear equation, a nonlinear equation, or equations of second and higher orders. The image processing apparatus shown in FIG. 27 can determine optimum predictive coefficients only when the function f is represented by a linear equation.

Specifically, if it is assumed that the pixel values of four pixels (X1, X2, X3, X4 shown in FIG. 2) making up the block outputted from the blocking circuit 111 shown in FIG. 21 are represented by y1, y2, y3, y4 (each having R, G, B components), and the mapping coefficients outputted from the mapping coefficient memory 114 are represented by k1, k2, k3, k4 (each having R, G, B components), then the image processing apparatus shown in FIG. 27 can be used when the calculating circuit 116 calculates a function value f (y1, y2, ..., k1, k2, ...) according to the following equation to determine corrected data:

$$f(\bullet) = k1y1 + k2y2 + k3y3 + k4y4$$

An optimum corrected data calculator 170 is supplied with a frame of a learning image suitable for being learned. The optimum corrected data calculator 170 comprises a compressor 171, a corrector 172, a local decoder 173, an error calculator 174, and a decision unit 175. The optimum corrected data calculator 170 calculates, from a learning image, pixel values (hereinafter referred to as "optimum corrected data") that make up a compressed image produced by reducing the number of pixels of the learning image and optimum for predicting an original image, and supplies the optimum corrected data to a latch circuit 176.

The learning image supplied to the optimum corrected data calculator 170 is supplied to the compressor 171 and the error calculator 174. The compressor 171 simply decimates the learning image at the same rate as the calculating circuit 116 shown in FIG. 21 decimates pixels, i.e., decimates the learning image to ½ in this embodiment, thereby compressing the learning image, and supplies the compressed learning image to the corrector 172.

The corrector 172 corrects the compressed learning image (hereinafter referred to as "compressed data") supplied from the compressor 171 under the control of the decision unit 175. Corrected data produced by the corrector 172 (hereinafter referred to as "corrected data" because the pixel value of a central pixel of a block of five pixels is corrected as with the output data from the calculating circuit 116 shown in FIG. 21) is supplied to the local decoder 173.

As with the local decoder 127 shown in FIG. 23, the local decoder 173 predicts the original image (learning image) based on the corrected data from the corrector 172, and supplies a predicted value to the error calculator 174.

As with the error calculator 128 shown in FIG. 23, the error calculator 174 calculates a predicted error for the predicted value from the local decoder 173 with respect to the original image data. The predicted error is supplied as error information to the decision unit 175.

Based on the error information from the error calculator 174, the decision unit 175 decides whether it is appropriate to use the corrected data from the corrector 172 as compressed data of the original image. If the decision unit 175 determines that it is not appropriate to use the corrected data from the corrector 172 as compressed data of the original image, then the decision unit 175 controls the corrector 172 to further correct the compressed data and output resultant new corrected data. If the decision unit 175 determines that it is appropriate to use the corrected data from the corrector 172 as compressed data of the original image, then the decision unit 175, the decision unit 175 supplies the corrected data supplied from the corrector 172 as optimum corrected data to the latch circuit 176.

The latch circuit 176 has a memory 176A for storing the optimum corrected data supplied from the corrector 172. The latch circuit 176 reads data of the optimum corrected data stored in the memory 176A, which corresponds to the central pixel of a block read from a memory 177A of a blocking circuit 177, and supplies the read data to a memory 180. When one frame of corrected data is stored in the memory 176A, the latch circuit 176 issues a control signal indicative of the storage of one frame of corrected data in the memory 176A to the blocking circuit 177.

The blocking circuit 177 is supplied with a frame of learning image, as with the optimum corrected data calculator 170. The blocking circuit 177 has the memory 177A which stores the supplied learning image. When the blocking circuit 177 receives the control signal from the latch circuit 176, the blocking circuit 177 converts the learning image stored in the memory 177A into blocks of five pixels, as with the blocking circuit 111 shown in FIG. 21, and successively reads and supply the blocks to an ADRC processing circuit 118 and the memory 180.

When the blocking circuit 177 reads a block from the memory 177A, the blocking circuit 177 supplies a control signal indicative of the position of the block to the latch circuit 176. Based on the control signal, the latch circuit 176 recognizes a block of five pixels read from the memory 177A, and reads optimum corrected data corresponding to the central pixel of the block from the memory 176A. Therefore, the memory 180 is simultaneously supplied with a block of five pixels and optimum corrected data corresponding to the block.

The ADRC processing circuit 178 and a classifying circuit 179 are identical in structure to the ADRC processing circuit 112 and the classifying circuit 113 shown in FIG. 21. Class information with respect to a block supplied from the blocking circuit 177, which is outputted from the classifying circuit 179, is supplied as an address to the memory 180.

The memory 180 stores the optimum corrected data supplied from the latch circuit 176 and the block supplied from the blocking circuit 177, in an associated fashion, at the address corresponding to the class information supplied from the classifying circuit 179. The memory 180 can store a plurality of items of information at one address, and hence store a plurality of sets of optimum corrected data and blocks corresponding to certain class information.

A calculating circuit 181 reads five pixels y1, y2, y3, y4, y5 of the 5-pixel block of the learning image and optimum corrected data y' associated with the block, from the memory 180, applies the method of least squares to each class to determine mapping coefficients k1 through k5, and supplies the mapping coefficients k1 through k5 to a memory 182. The memory 182 stores the mapping coefficients k1 through k5 for each class supplied from the calculating circuit 181 at an address corresponding to the class.

Operation of the image processing apparatus shown in FIG. 27 will be described below with reference to FIG. 28.

When a learning image is supplied, the learning image is stored in the memory 177A of the blocking circuit 177 and supplied to the optimum corrected data calculator 170. When the optimum corrected data calculator 170 receives the learning image, the optimum corrected data calculator 170 calculates optimum corrected data with respect to the learning image in a step S101.

Figure 7:
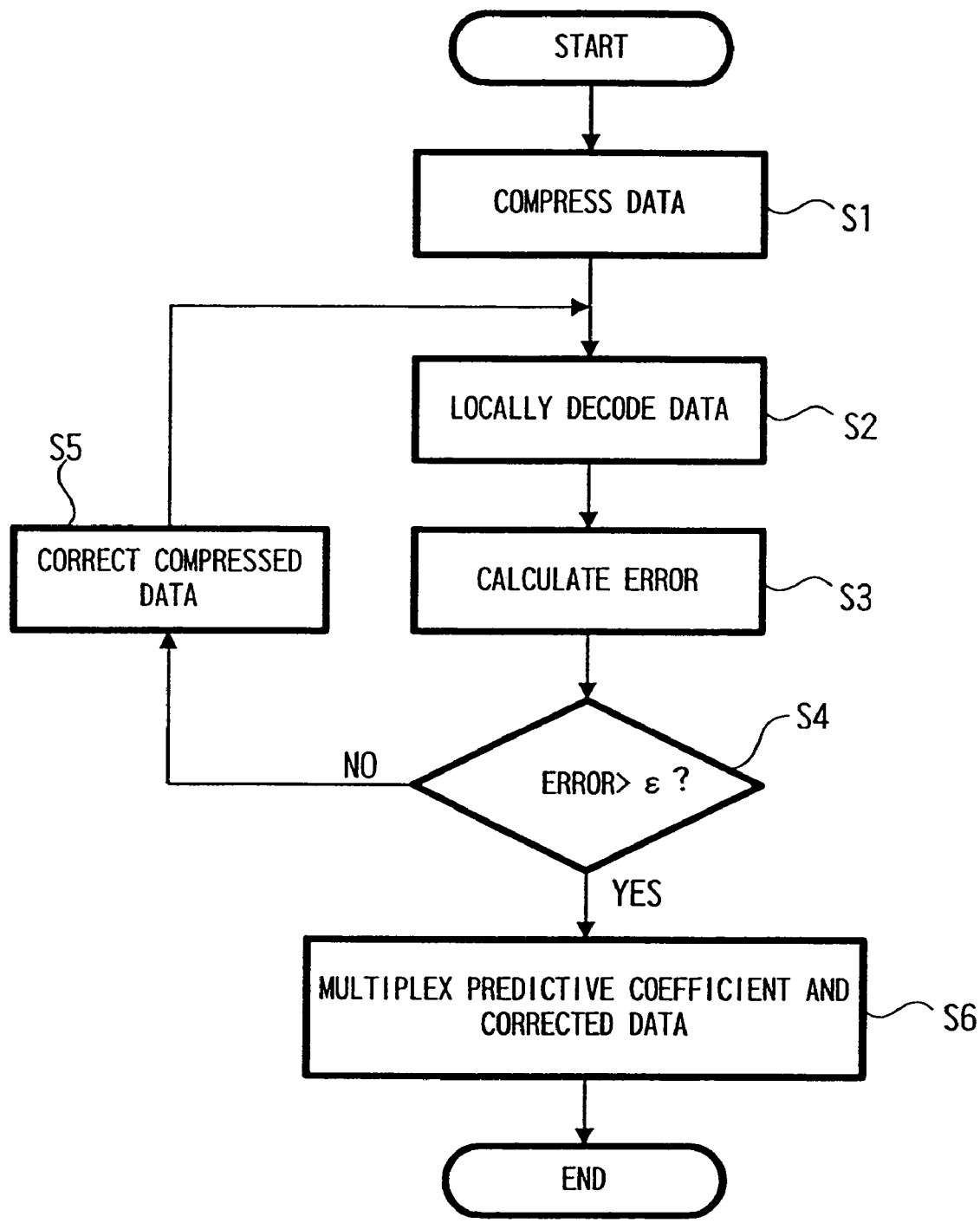
FIG. 7 is a flowchart of an operation sequence of the transmitting apparatus 1 shown in FIG. 6.

The processing in the step S101 is the same as the operation sequence shown in FIG. 7. Specifically, the compressor 171 generates compressed data by decimating the learning image to ½ in the step S1, and outputs the compressed data, without correcting same at first, to the local decoder 173 through the corrector 172. The local decoder 173 calculates a predicted value for the original image (locally decodes the corrected data) based on the corrected data from the corrector 172 (at an initial stage, the compressed data produced by simply decimating the image data, as described above) in the step S2. The predicted value is supplied to the error calculator 174.

When the error calculator 174 receives the predicted value for the original image from the local decoder 173, the error calculator 174 calculates a predicted error for the predicted value from the local decoder 173 with respect to the original image data, and supplies the predicted error as error information to the decision unit 175 in the step S3. Upon reception of the error information from the error calculator 174, the decision unit 175 decides whether it is appropriate to use the corrected data outputted from the corrector 172 as encoded data of the original image, based on the error information, in the step S4.

Specifically, the decision unit 175 decides whether the error information is smaller than the predetermined threshold $\epsilon$ or not in the step S4. If the error information is not smaller than the predetermined threshold $\epsilon$, then the decision unit 175 determines that it is not appropriate to use the corrected data outputted from the corrector 172 as compressed data of the original image, and control proceeds to the step S5 in which the decision unit 175 controls the corrector 172 to correct the compressed data outputted from the compressor 171. Under the control of the decision unit 175, the corrector 172 varies the corrective quantity (corrective value $\Delta$), corrects the compressed data, and outputs resultant corrected data to the local decoder 173. Control then returns to the step S2, and repeats the above cycle.

The compressed data may be corrected in the same fashion as the mapping coefficients are changed as described above with reference to FIG. 23.

If the error information is smaller than the predetermined threshold $\epsilon$ in the step S4, then the decision unit 175 determines that it is appropriate to use the corrected data outputted from the corrector 172 as compressed data of the original image, and outputs the corrected data produced when the error information smaller than the predetermined threshold $\epsilon$ is obtained, as optimum corrected data from the corrector 172 to the latch circuit 176, in which the optimum corrected data is stored in the memory 176A. Then, control returns.

As described above, corrected compressed data produced when the error information is smaller than the predetermined threshold $\epsilon$ is stored as optimum corrected data in the memory 176A. Since the optimum corrected data is produced when the error information is smaller than the predetermined threshold $\epsilon$, when a predicted value is calculated using the optimum corrected data, it is possible to produce an image which is essentially the same as the original image based on the corrected data.

Figure 28:
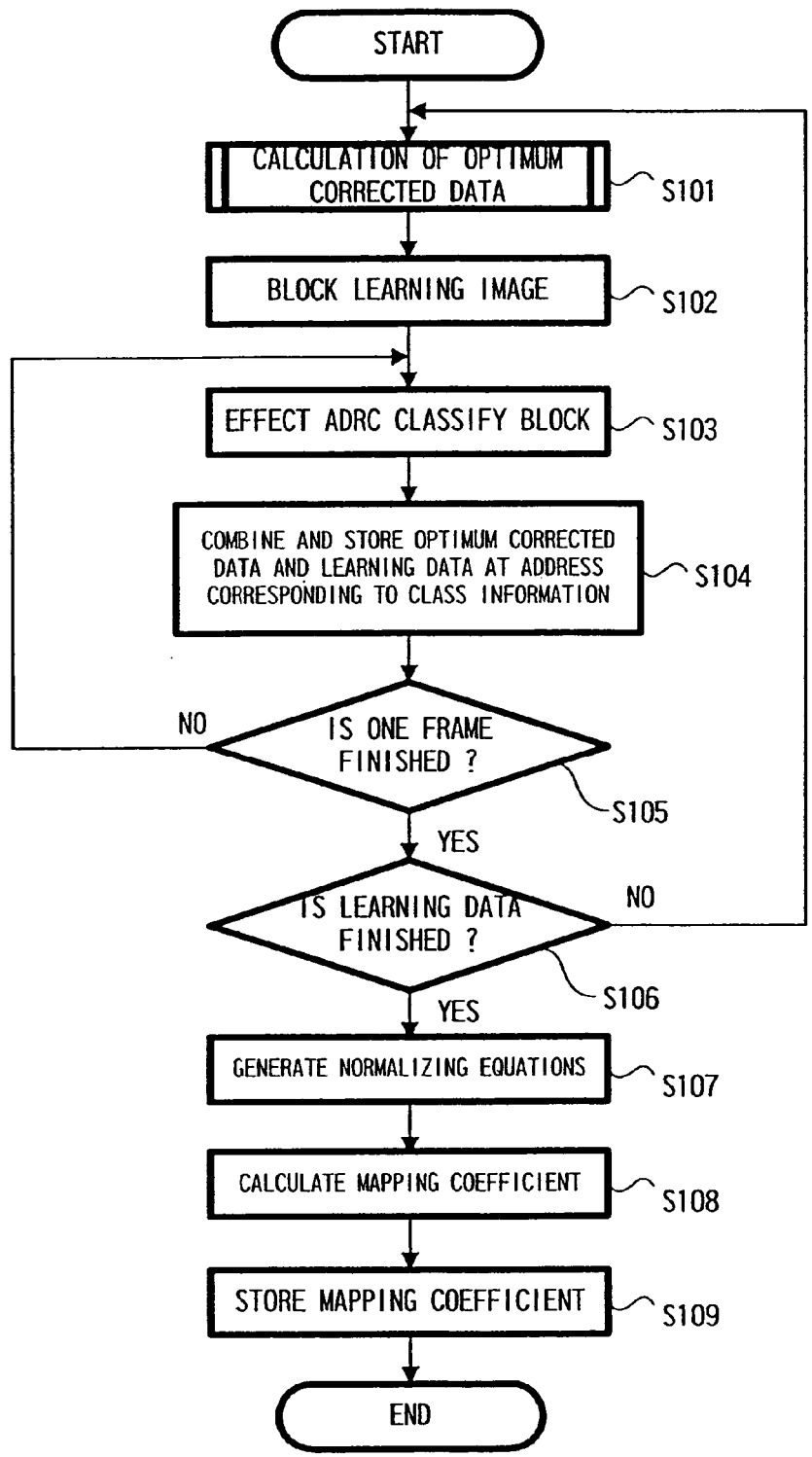
FIG. 28 is a flowchart of an operation sequence of the image processing apparatus shown in FIG. 27.

In FIG. 28, when the latch circuit 176 stores one frame of optimum corrected data in the memory 176A, the latch circuit 176 outputs a control signal to the blocking circuit 177. In response to the control signal from the latch circuit 176, the blocking circuit 177 converts the learning image stored in the memory 177A into a block of five pixels in a step S102. The blocking circuit 177 reads the block stored in the memory 177A and supplies the block to the ADRC processing circuit 178 and the memory 180.

At the same time, when the blocking circuit 177 reads the block from the memory 177A, the blocking circuit 177 supplies a control signal indicative of the position of the block to the latch circuit 176. Based on the control signal, the latch circuit 176 recognizes the block of five pixels read from the memory 177A, reads optimum corrected data corresponding to the central pixel of the block, and supplies the optimum corrected data to the memory 180.

Control proceeds to a step S103 in which the ADRC processing circuit 178 effects an ADRC process on the block from the blocking circuit 177, and the block is classified by the classifying circuit 179. The resultant class is supplied as an address to the memory 180.

In a step S104, the memory 180 stores the optimum corrected data supplied from the latch circuit 176 and the block (learning data) supplied from the blocking circuit 177, in an associated fashion, at the address corresponding to the class information supplied from the classifying circuit 179.

Control then goes to a step S105 which decides whether one frame of blocks and optimum corrected data has been stored in the memory 180 or not. If one frame of blocks and optimum corrected data has not been stored in the memory 180, then a next block is read from the blocking circuit 177, and optimum corrected data corresponding to the block is read from the latch circuit 176, after which control returns to the step S103. The step S103 and following steps are repeated.

If one frame of blocks and optimum corrected data has been stored in the memory 180, then control goes to a step S106 which decides whether the processing of all learning images has been finished or not. If the processing of all learning images has not been finished, control goes back to the step S101, and the step S101 and following steps are repeated with respect to a next learning image.

If the processing of all learning images has been finished, control proceeds to a step S107 in which the calculating circuit 181 reads optimum corrected data and blocks with respect to classes from the memory 180, and establishes normal equations such as the normal equations (7). The calculating circuit 181 solves the normal equations to calculate mapping coefficients for the classes to minimize an error in a step S108. The mapping coefficients are supplied to and stored in the memory 182 in a step S109, after which the operation sequence comes to an end.

If the function f is expressed by a linear equation, the mapping coefficients stored in the memory 182 are stored in the mapping coefficient memory 114 shown in FIG. 21 for encoding the image.

For some classes, as many normal equations as required to determine mapping coefficients may not be obtained. In such a case, mapping coefficients for outputting an average value, for example, of five pixels of the block outputted from the blocking circuit 111, e.g., mapping coefficients k1 through k5=$\frac{1}{5}$, are established as default values in the calculating circuit 116 shown in FIG. 21.

Figure 29:
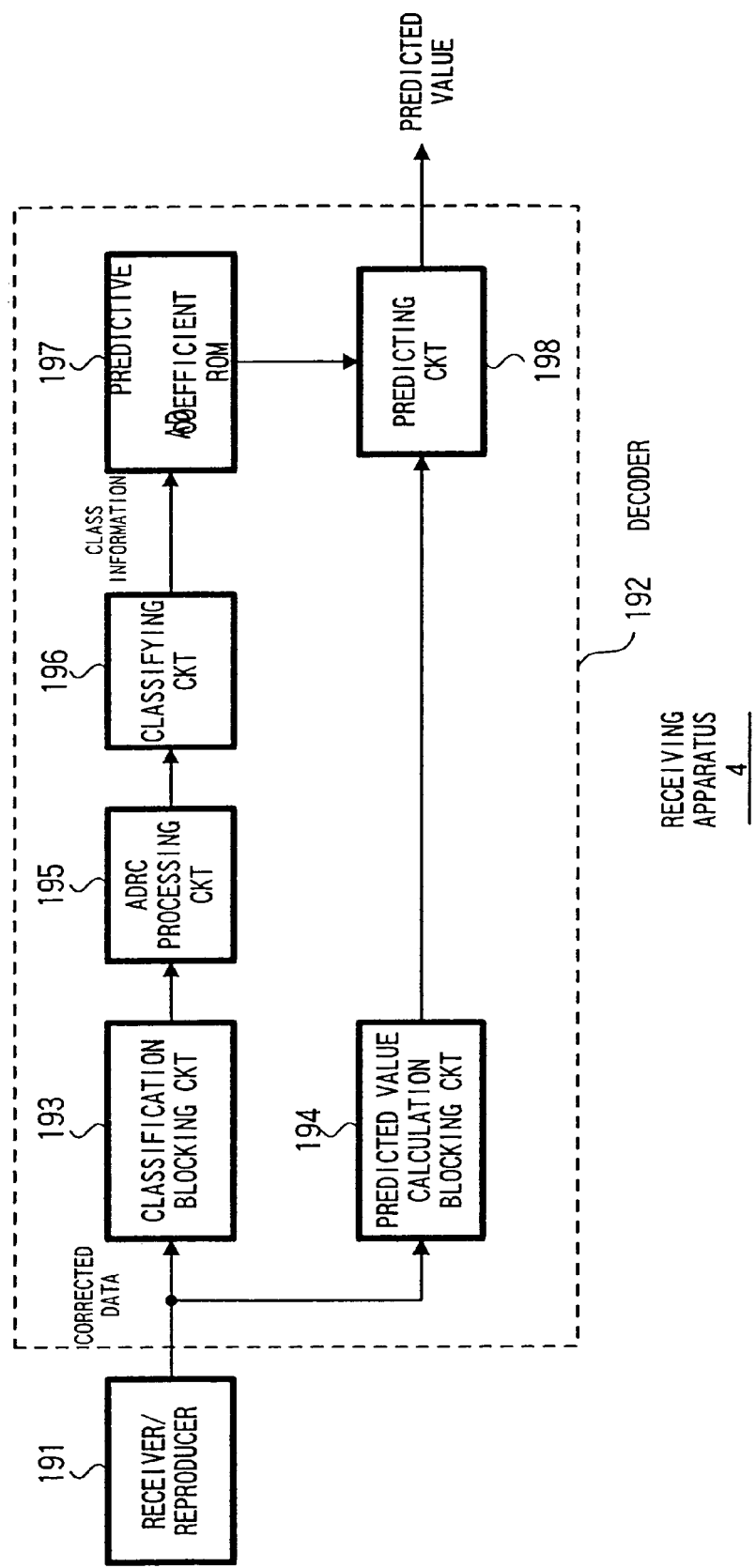
FIG. 29 is a block diagram of still another arrangement for the receiving apparatus 4 shown in FIG. 1.

FIG. 29 shows an arrangement for the receiving circuit 4 which corresponds to the transmitting apparatus shown in FIG. 21.

A receiver/reproducer 191 reproduces encoded data recorded in the recording medium 2 or receives encoded data transmitted over the transmission path 3, and supplies the encoded data to a decoder 192.

The decoder 192 comprises a classification blocking circuit 193 through a predicting circuit 198 which correspond respectively to the classification blocking circuit 141 through a predicting circuit 146 in the local decoder 127 shown in FIG. 25. The decoder 192 determines a predicted value from corrected data and outputs an image composed of the predicted value as a decoded image, as with the local decoder 127 shown in FIG. 25.

The corrected data makes error information smaller than a predetermined threshold, so that the receiving apparatus can obtain an image which is substantially the same as the original image.

In the reception side, the receiving apparatus 4 shown in FIG. 29 may not be used, but an apparatus for decoding a decimated image by way of interpolation may be used to obtain a decoded image by way of ordinary interpolation. However, decoded images thus obtained are of degraded image quality (resolution).

In the above embodiment, R, G, B components are used to express image data. However, component signals may be a combination of a luminance signal Y, a color signal I, and a color signal Q, which are expressed by equations given below, or a combination of a luminance signal Y, a color difference signal R−Y, and a color difference signal B−Y, or C (cyan), M (magenta), and Y (yellow) used mainly in the art of printing, or a combination of them and K (black).

$$I=0.60R-0.28G-0.32B$$

$$Q=0.21R-0.52G+0.31B$$

$$R-Y=0.7R-0.59G+0.11B$$

$$B-Y=-0.3R-0.59G+0.89B$$

$$C=255-R$$

$$M=255-G$$

$$Y=b\ 255-B$$

where C, M, R are expressed by additive color mixtures of R, G, B each of 8 bits.

ADVANTAGES OF THE INVENTION

With an apparatus for processing an image according to claim 1 and a method of processing an image according to claim 5, a first component signal of a second image is predicted from first and second component signals of a first image, and a second component signal of the second image is predicted from the first and second component signals of the first image. Therefore, it is possible to effect a predicting process efficiently highly accurately.

With an apparatus for encoding an image according to claim 6 and a method of encoding an image according to claim 10, an image is predicted using predicted data including a plurality of image data expressed by vectors in a color space. Therefore, it is possible to encode the image efficiently, and encode the image so that the image can be decoded highly accurately.

INDUSTRIAL APPLICABILITY

As described above, an apparatus for and a method of processing image data and an apparatus for and a method of encoding image data according to the present invention are suitable for use as an apparatus for and a method of processing image data and an apparatus for and a method of encoding image data for predicting image data efficiently and accurately.

The invention claimed is:

1. An apparatus for encoding an image, comprising:
compressing means for compressing a plurality of pixel data representative of a color image and expressed by vectors in a color space representing red, green and blue (R, G, B) components by making the pixel data fewer;
classifying means for classifying the compressed pixel data into a class;
memory means for storing predictive data corresponding to said class and including the pixel data expressed by vectors in the color space; and
predicting means for predicting an image using the predictive data.

2. A method of encoding an image, comprising the steps of:
compressing a plurality of pixel data representative of a color image and expressed by vectors in a color space representing red, green and blue (R, G, B) components by making the pixel data fewer;
classifying the compressed pixel data into a class;
storing predictive data corresponding to said class and including the pixel data expressed by vectors in the color space; and
predicting an image using the predictive data.

* * * * *